Figures 1A, 1B, 2:
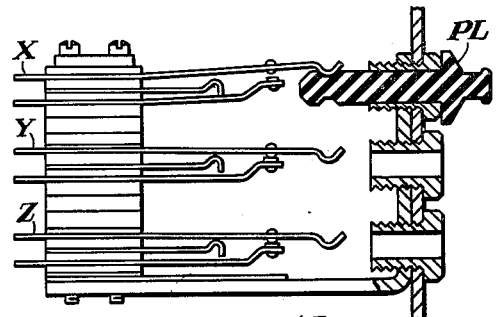

Dec. 16, 1952 A. P. JACKEL 2,622,142
AUTOMATIC RESERVATION SYSTEM OF THE CODE TYPE
Filed July 22, 1950 12 Sheets-Sheet 1

INVENTOR.
Arthur P. Jackel
BY
W. L. Stout
HIS ATTORNEY

INVENTOR.
Arthur P. Jackel
BY
W. L. Stout
HIS ATTORNEY

Dec. 16, 1952  A. P. JACKEL  2,622,142
AUTOMATIC RESERVATION SYSTEM OF THE CODE TYPE
Filed July 22, 1950  12 Sheets-Sheet 4

INVENTOR.
Arthur P. Jackel
BY
W. L. Stout
HIS ATTORNEY

Dec. 16, 1952  A. P. JACKEL  2,622,142
AUTOMATIC RESERVATION SYSTEM OF THE CODE TYPE
Filed July 22, 1950  12 Sheets-Sheet 6

INVENTOR.
Arthur P. Jackel
BY
W. L. Stout
HIS ATTORNEY

INVENTOR.
Arthur P. Jackel

Dec. 16, 1952   A. P. JACKEL   2,622,142
AUTOMATIC RESERVATION SYSTEM OF THE CODE TYPE
Filed July 22, 1950   12 Sheets-Sheet 12

INVENTOR.
Arthur P. Jackel
BY
W. L. Stout
HIS ATTORNEY

Patented Dec. 16, 1952

2,622,142

UNITED STATES PATENT OFFICE 2,622,142

AUTOMATIC RESERVATION SYSTEM OF THE CODE TYPE

Arthur P. Jackel, Penn Township, Allegheny County, Pa., assignor to Westinghouse Air Brake Company, a corporation of Pennsylvania Application July 22, 1950, Serial No. 175,451

10 Claims. (Cl. 177—353)

The object of my invention is the provision of a system for selecting and transmitting items of information posted at a central station, to any one of a plurality of remote stations, and in the specific embodiment shown, the apparatus of my invention comprises an improved automatic reservation system for facilitating the sale or reservation of transportation accommodations. More particularly, my invention relates to an improved remote control system by means of which agents at a large number of remote stations are enabled, by positioning certain control devices, to send code messages to a central office without interference, each message constituting a request for information stored in a central reservation board as to the availabiliy of different types of accommodations on a selected date on a particular train or trip. Upon the reception of each request code, a reply code is transmitted automatically from the office to the sending station by means of which a series of visual indicators is controlled to indicate to the agent whether or not each of the different types of accommodation or space provided on the selected train or trip, are available on the selected date.

My invention includes a code communication system having a coding unit at the office and at each station of the all-relay step-by-step type for the transmission and reception of code signals, which is a modification of the system identified as the "time code" system disclosed in my Letters Patent of the United States No. 2,411,375, issued November 19, 1946, for Remote Control Systems.

A feature of the present invention comprises an improved system of line circuits for communicating between a central office and a large number of remote stations. In accordance with one feature of my invention, the stations are connected radially instead of serially as heretofore, and a separate normally open communication line circuit extends from the office to each of a plurality of remote stations. Each circuit includes a source of current, a normally open transmitting contact at the corresponding station, and a normally deenergized line relay at the office which responds to the closing of the transmitting contact at the station to seize the office coding unit and to cause a request code to be transmitted to the office by the coding unit at the initiating station, followed by a reply code which the office coding unit transmits automatically to such station. This apparatus is so arranged that when stations on different line circuits initiate request codes simultaneously, or at a time when the office coding unit is in use, the various line circuits are connected to the office coding unit one at a time so as to enable the stations on different lines to transmit their codes in a predetermined sequential order without interference. In addition, each station which has transmitted one of a series of successive codes is prevented from transmitting a second code until the series is completed.

A further feature of this line circuit system resides in provisions by which intermediate stations may be included in each of the radial line circuits; that is, each of the line circuits which extends from a remote station to the central office may be used by a plurality of serially connected stations as in the system of my prior patent. Another feature is that each station may include a plurality of agents' consoles for controlling the same station coding unit so as to enable a plurality of agents at different locations in the same station to communicate with the office over the same line circuit one at a time without interference.

The line circuit system of my invention is adapted to employ existing long distance communication circuits used jointly for telephone communication or the like, each of my line circuits being alternatively of the two-wire central battery type, or of the four-wire carrier current type. A feature of my invention resides in the provision of repeaters of a novel type for extending the length of the line circuit sections, including one of the 2—2 type for connecting two two-wire circuits, repeaters of the 2—4 type and of the 4—2 type for connecting a two-wire battery circuit to a four-wire carrier current circuit, and one of the 4—4 type for connecting two four-wire circuits.

In accordance with a further feature of my invention the central office apparatus may be modified to employ a plurality of office coding units with separate connections to the central reservation board, so as to permit simultaneous communication between the office and two or more stations without interference, even though connections are made for the transmission of information posted in the same sections of the reservation board. In accordance with this feature of the invention, the stations are arranged in groups each having an office coding unit assigned thereto, but the groups are interconnected in such a manner that when the office coding unit normally employed by a station is in use it may seize an idle coding unit which normally is associated with stations of another group.

In addition to the line circuit system, my invention includes improved apparatus units suitable for use in a system of the type described, and an improved arrangement of coding apparatus for reliably performing a desired sequence of selecting operations rapidly and in a straightforward and logical manner while minimizing the liability of error.

I shall describe one form of apparatus embodying my invention and various modifications of portions thereof, and shall then point out the novel features of the system of my invention in claims.

In the accompanying drawings, Fig. 1A is a view of a portion of the reservation board employed at the central office for the storage of train information, and Fig. 1B is a vertical cross-section of a portion of Fig. 1A showing three of the plug receptacles and one of the removable plugs.

Fig. 2 is a front view of the console or control panel provided for each agent at a station.

Figure 3A:
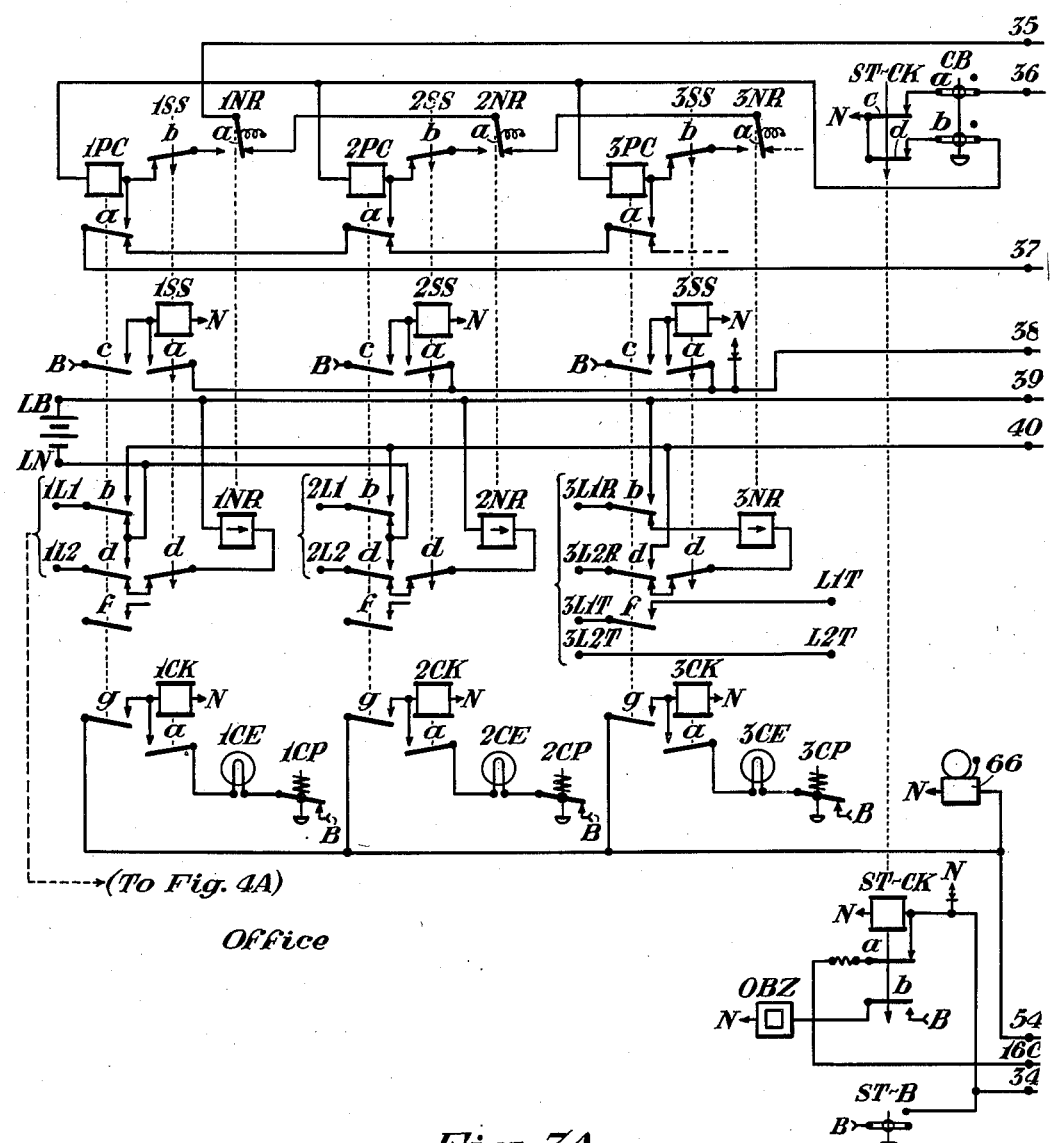
Figure 3B:
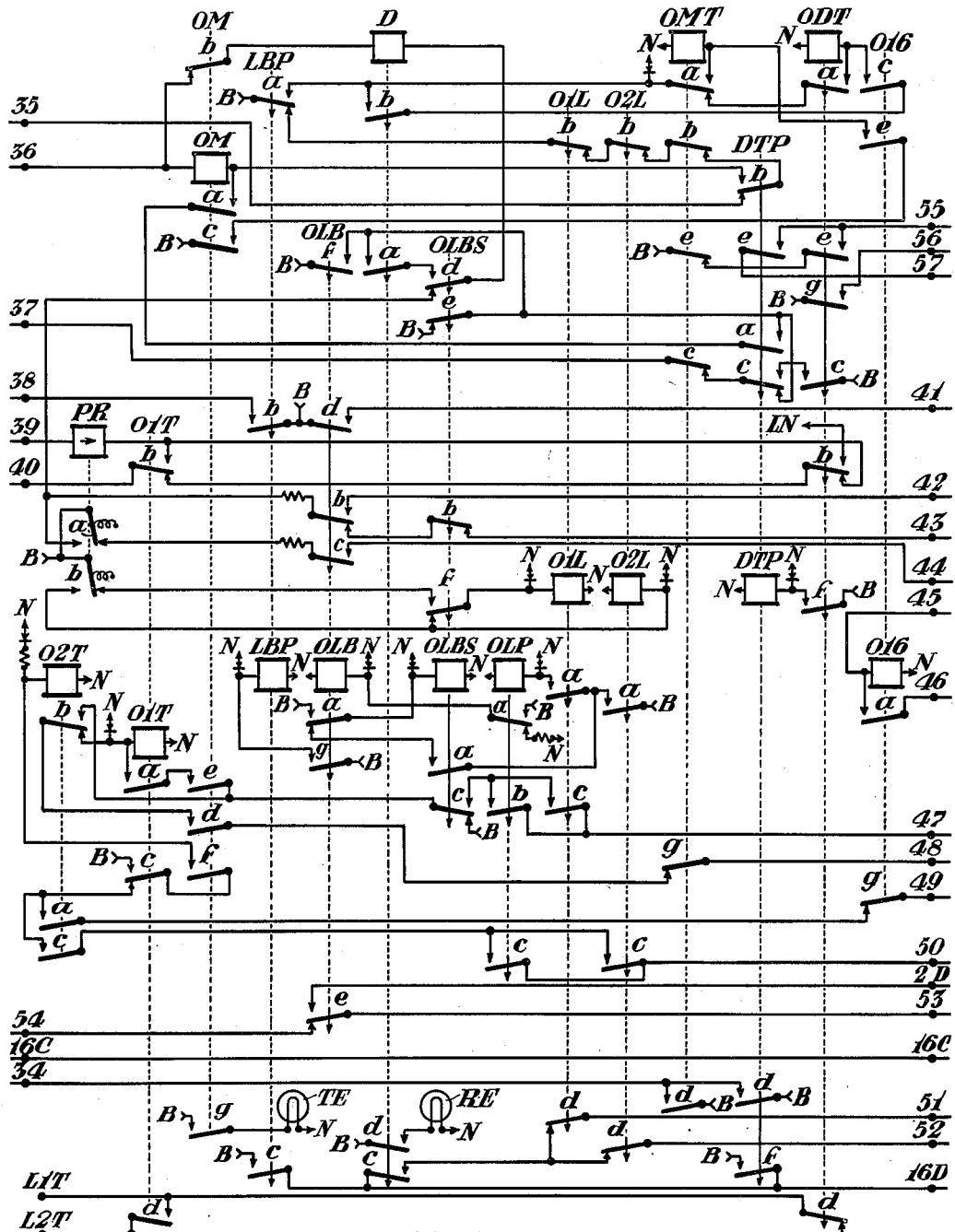
Figure 3C:
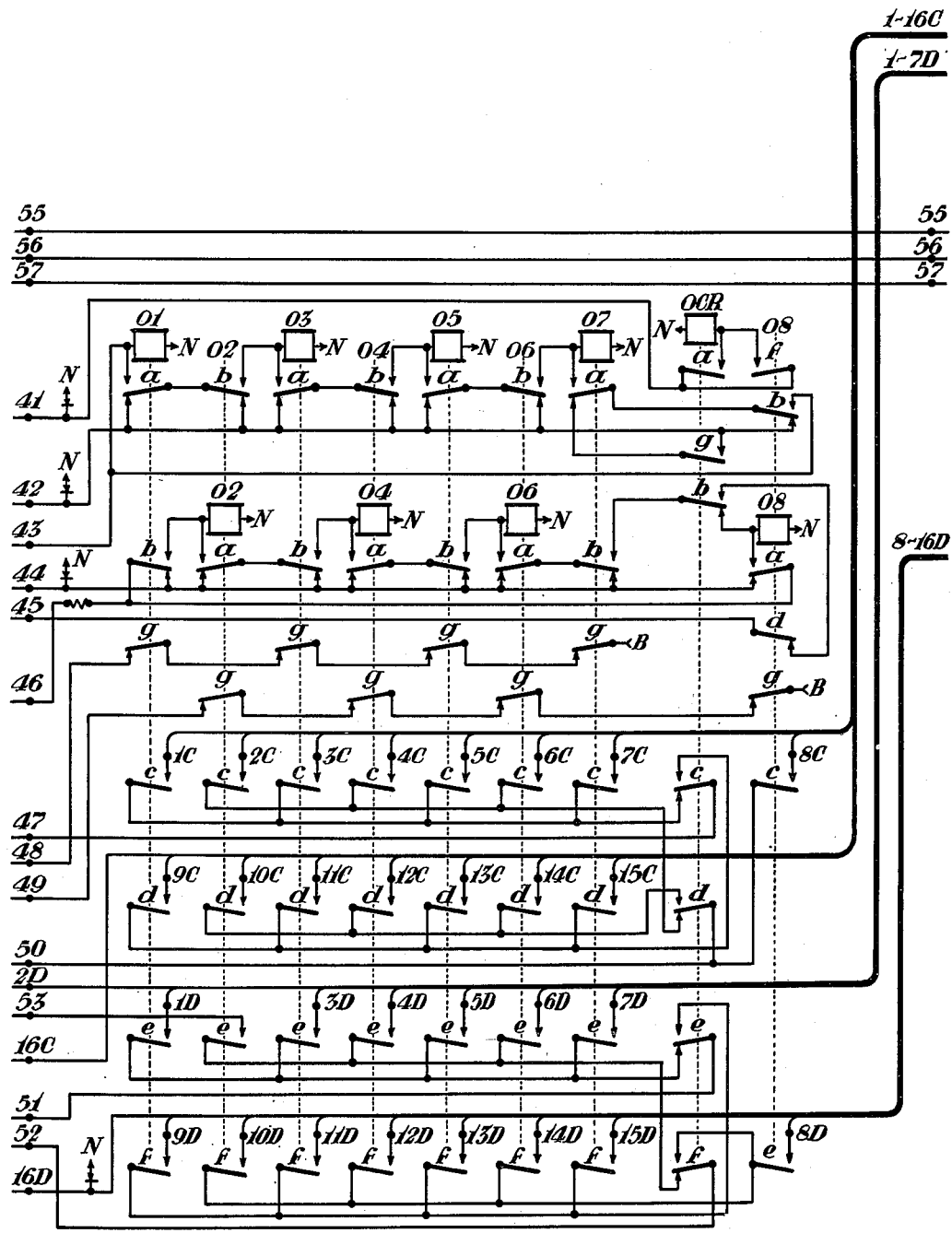
Figure 3D:
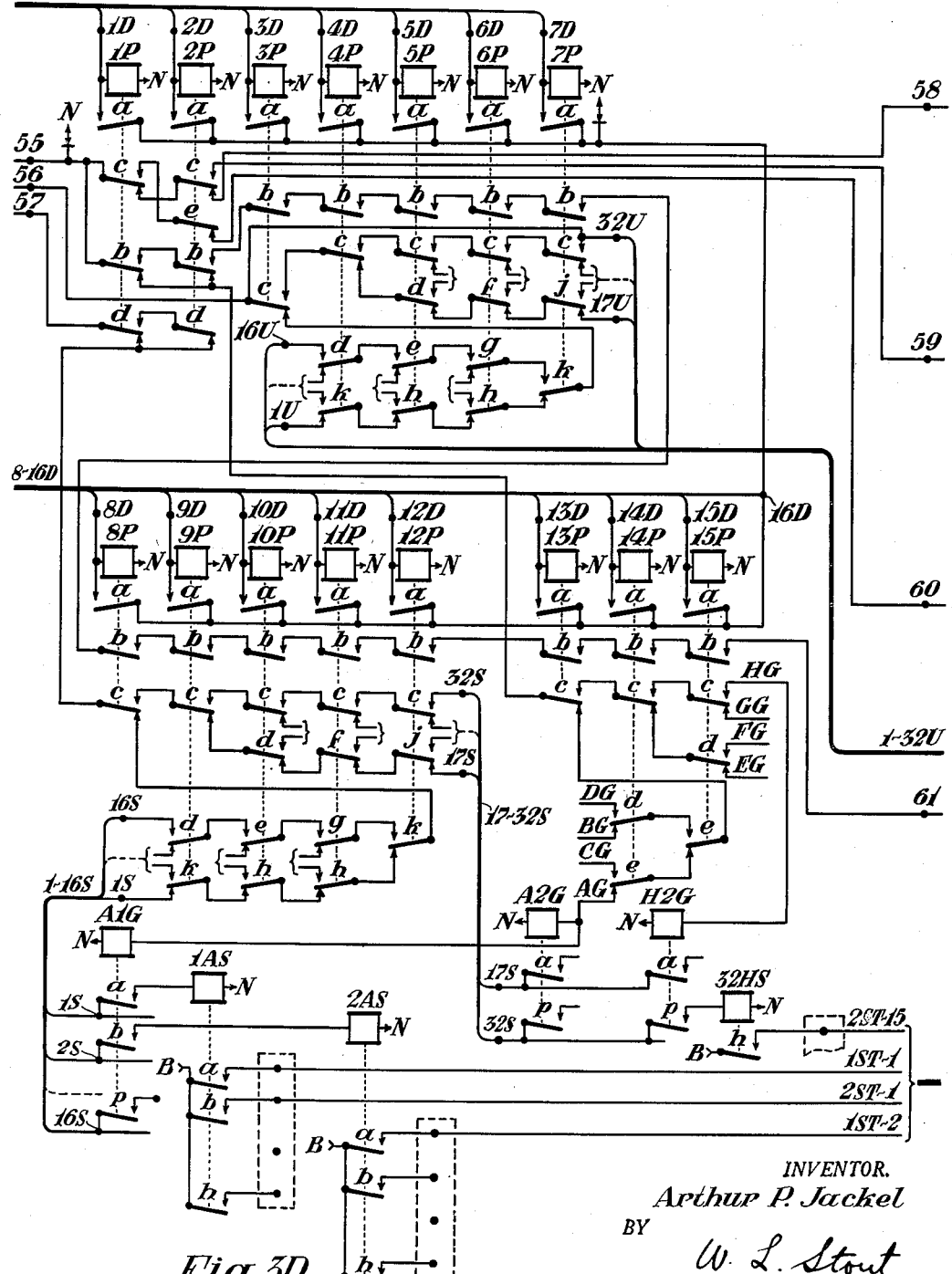
Figure 3E:
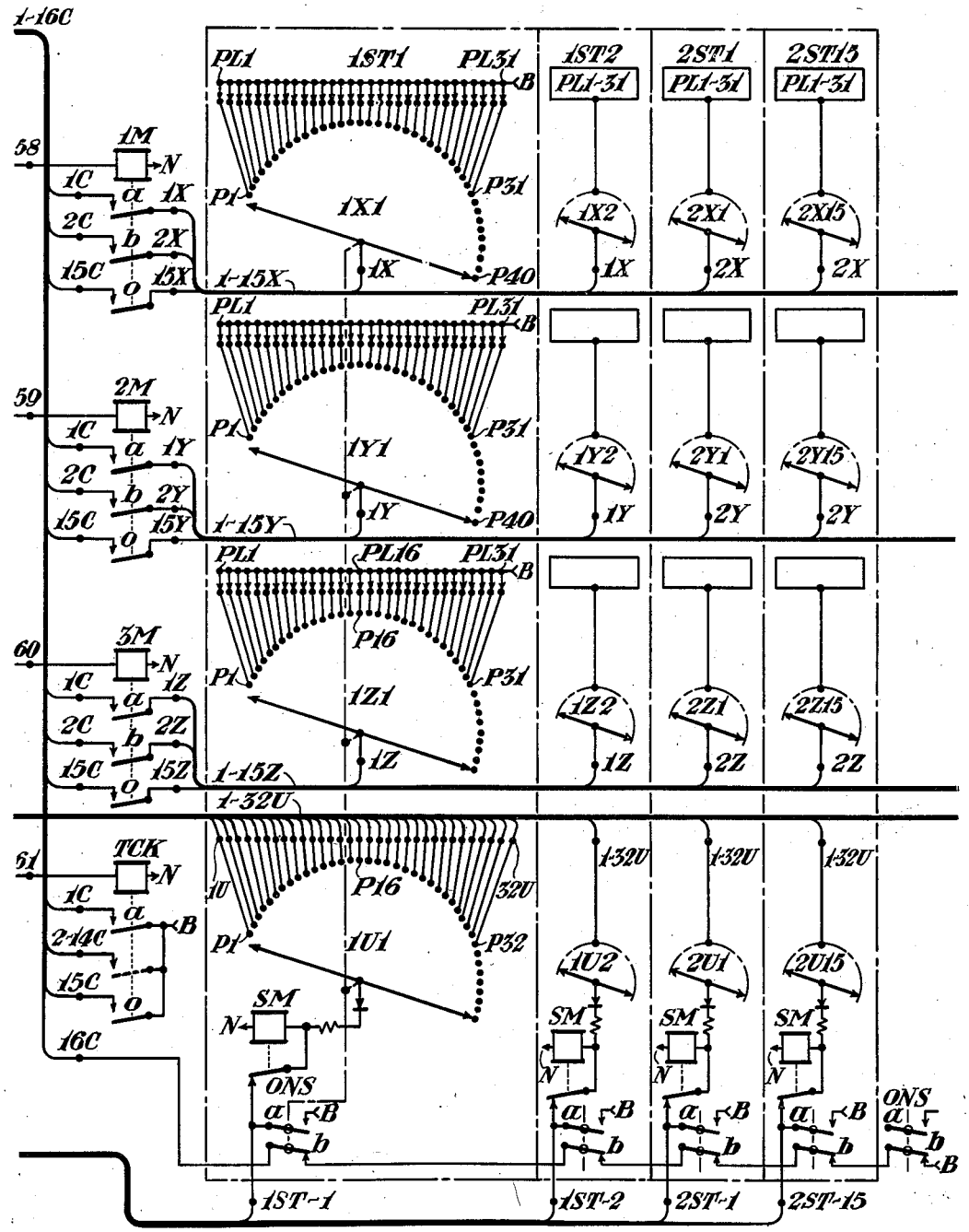

Figs. 3A to 3E, inclusive, comprise a diagram of the circuits at the central office, in which Fig. 3A shows typical connections between the office coding unit and the communication lines which radiate from the office, Fig. 3B shows the control portion of the office coding unit, Fig. 3C shows the counting relays of the office coding unit, Fig. 3D shows the register and selector relays which are governed by the different request codes, and Fig. 3E shows the circuits for one of a plurality of similar rotary stepping switches, of which one is provided for each section of the reservation board of Fig. 1A for the purpose of establishing connections for enabling the transmission of reply codes to be governed in accordance with the condition of selected ones of the plug switches of Fig. 1B.

Figure 4A:
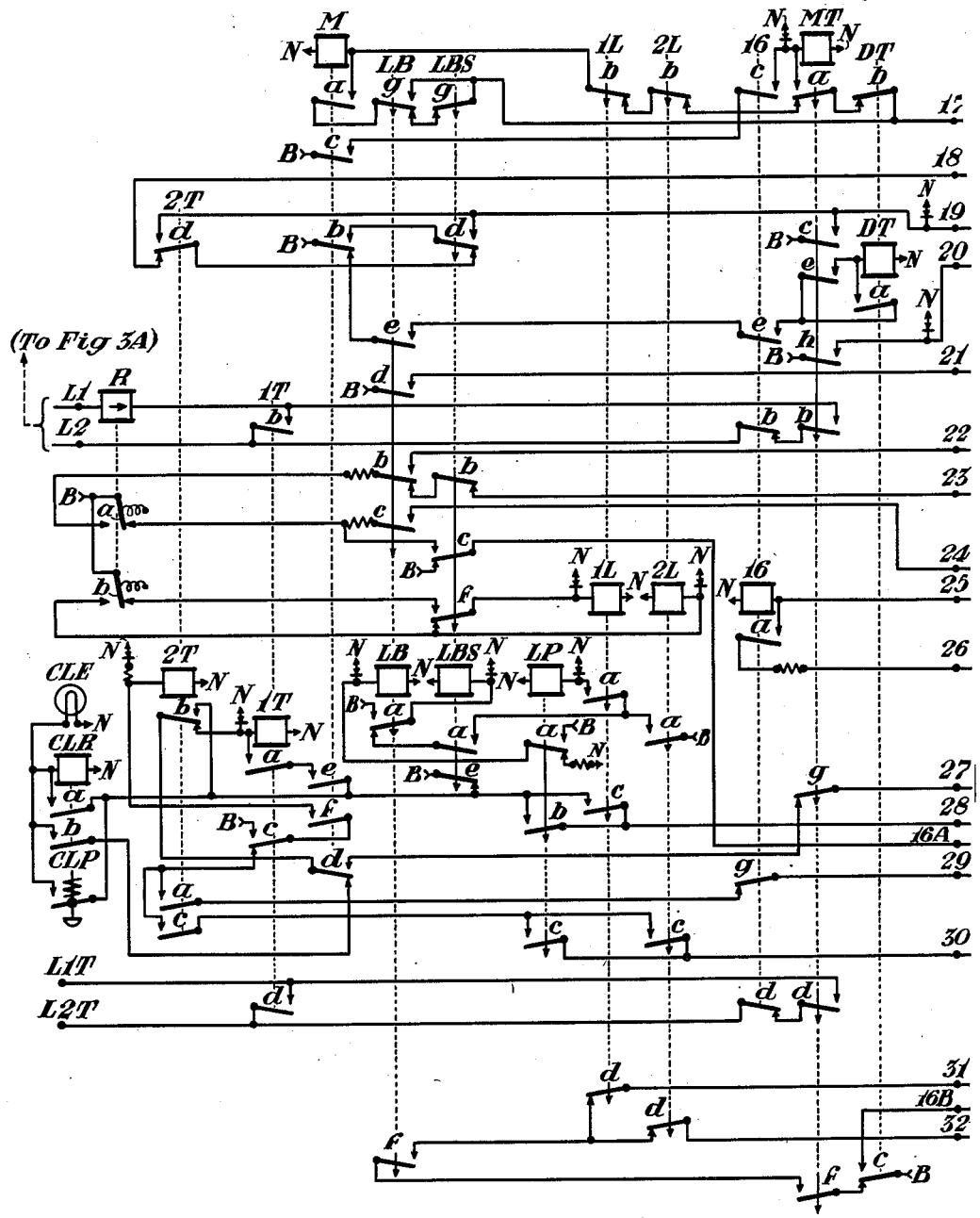
Figure 4B:
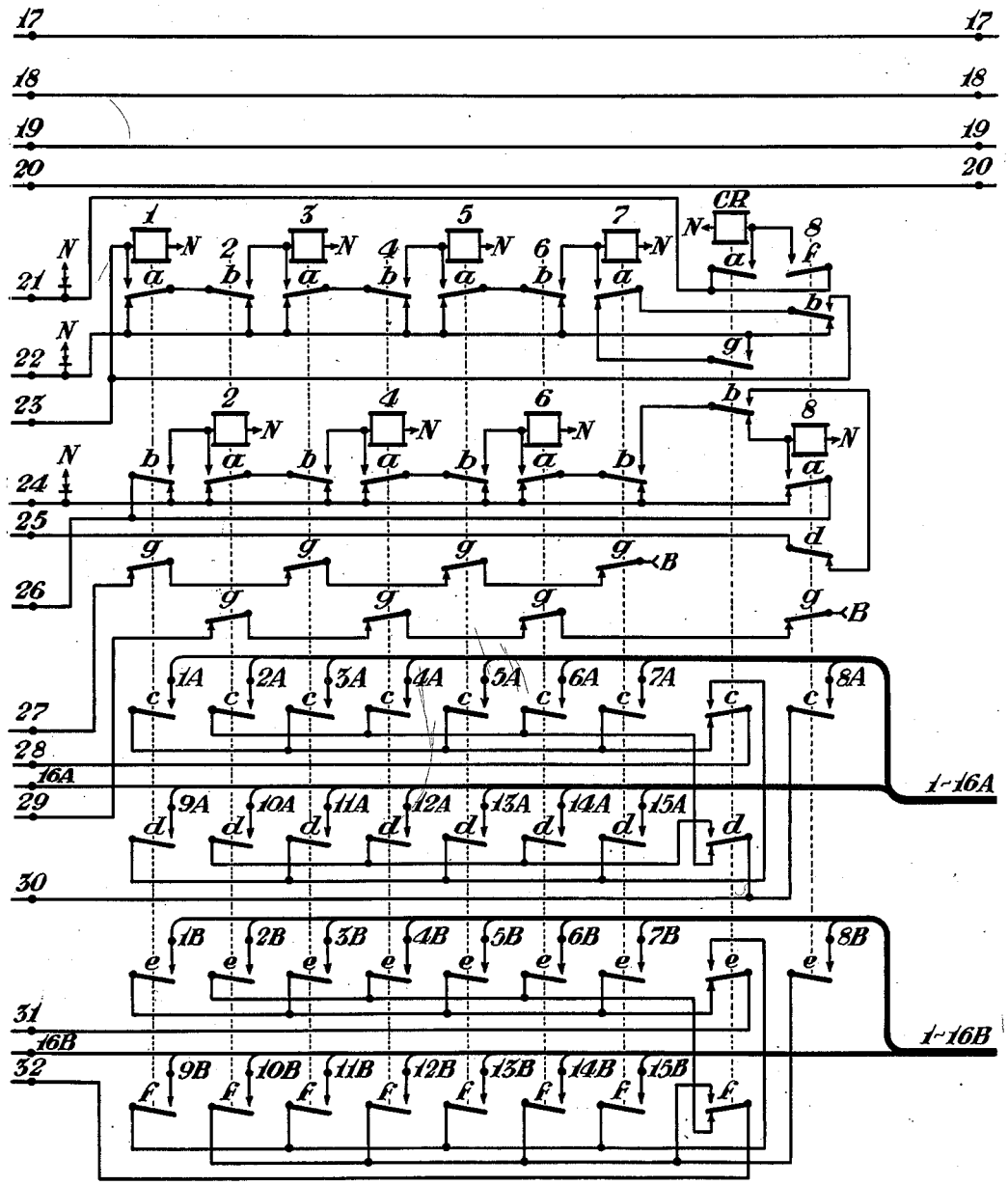
Figure 4C:
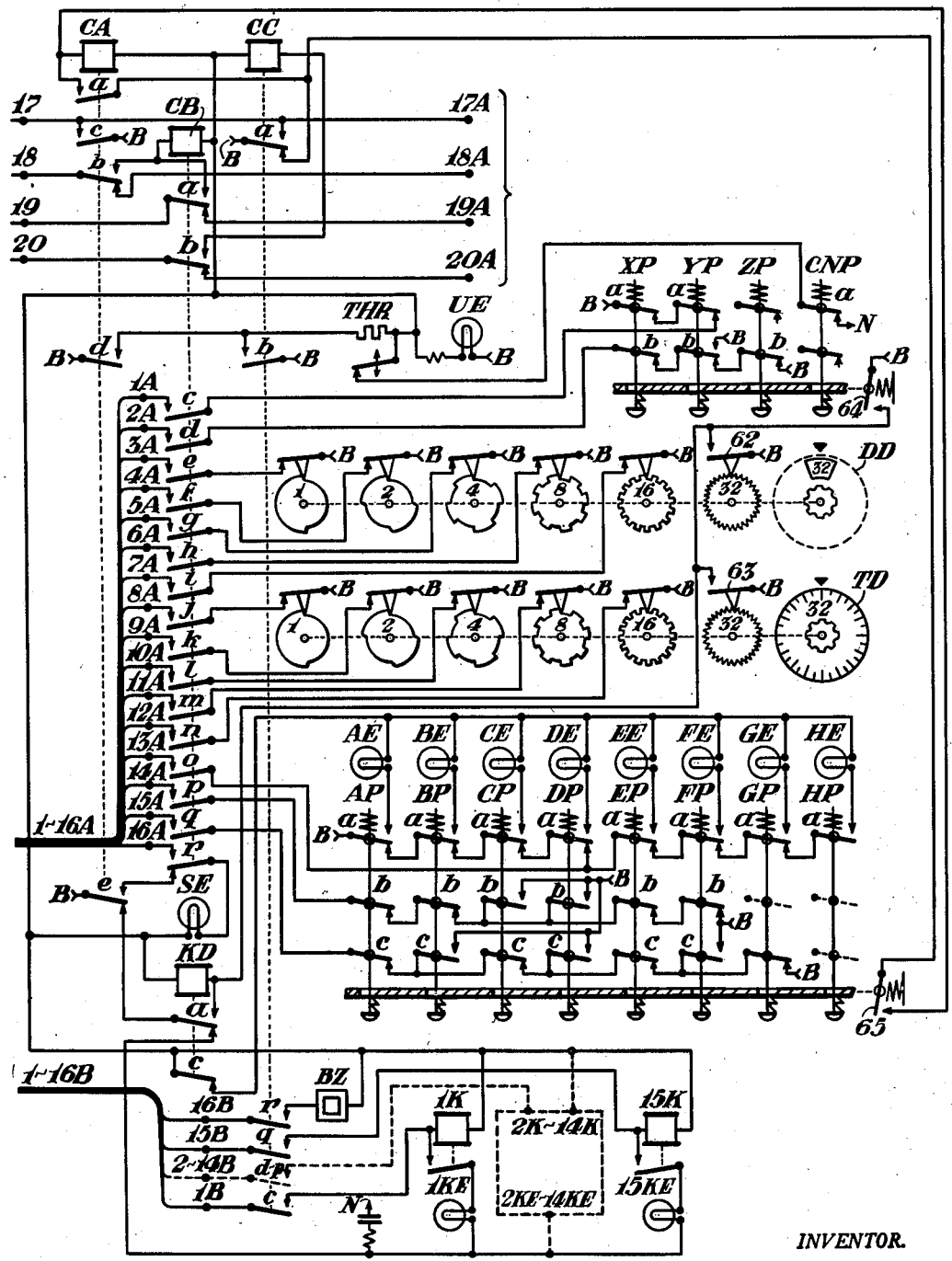

Figs. 4A, 4B, and 4C comprise a diagram of the circuits at a typical agent's station, in which Fig. 4A shows the control portion of the station coding unit and the line connections, Fig. 4B shows the counting relays of the station coding unit, and Fig. 4C shows the local circuits and apparatus included in each of the consoles of Fig. 2.

Figure 5:
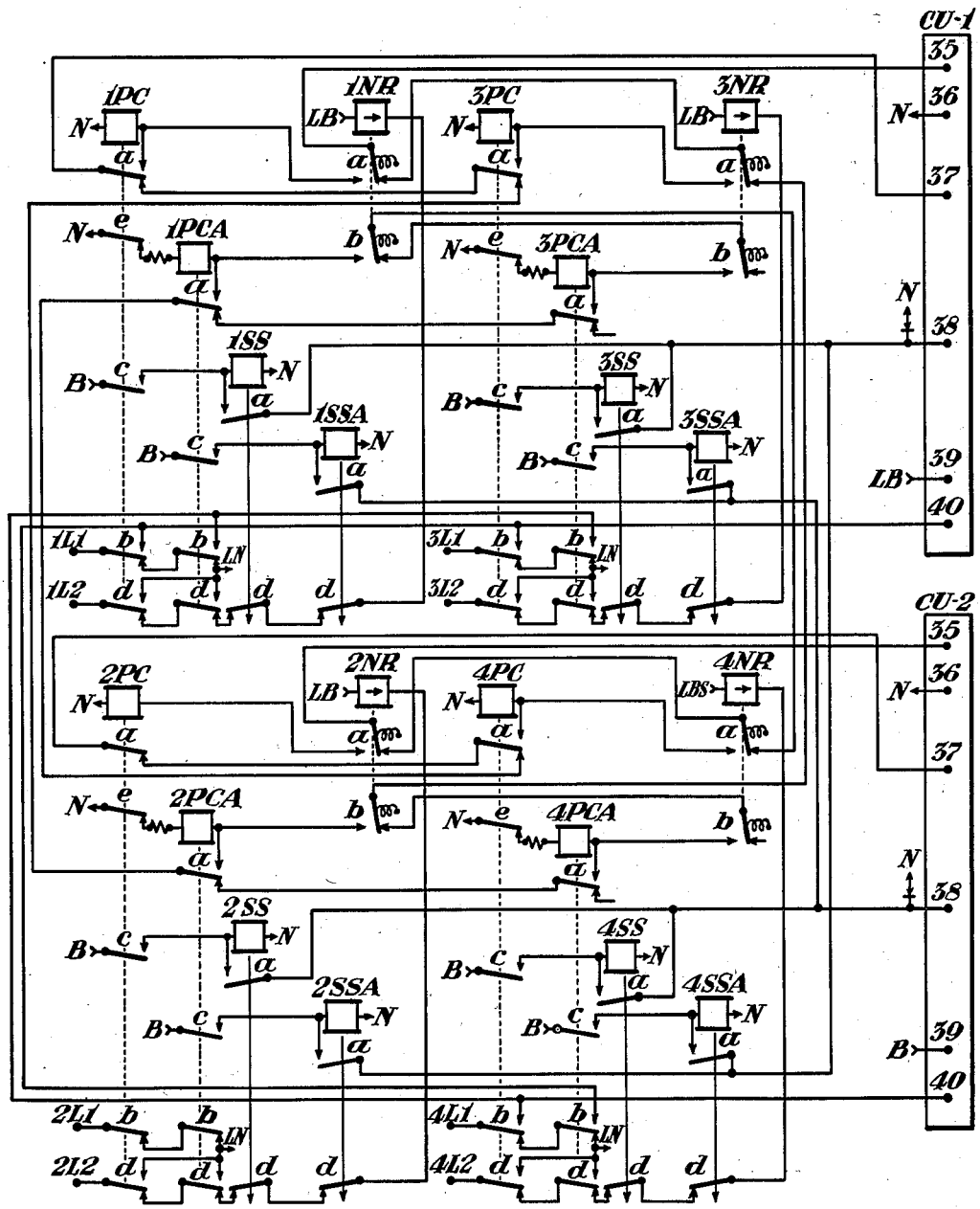

Fig. 5 is a diagram of circuits comprising a modification which may be substituted for Fig. 3A to provide line connections for two sets of the apparatus of Figs. 3B–3E, connected to the same reservation board. This modification enables two agents on any two of the lines to establish communication with the reservation board at the same time.

Figure 6:
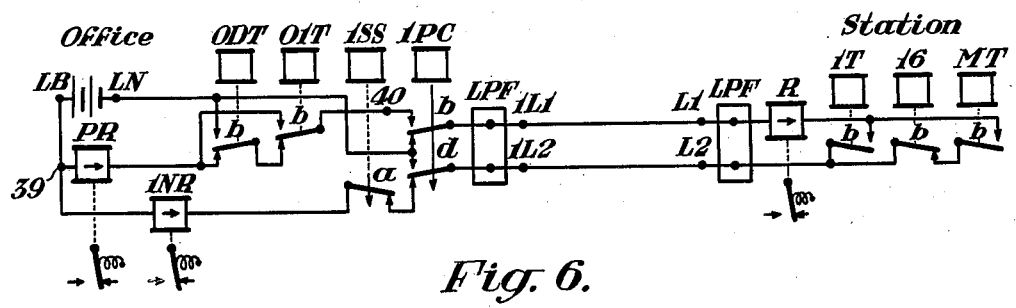
Figure 7:
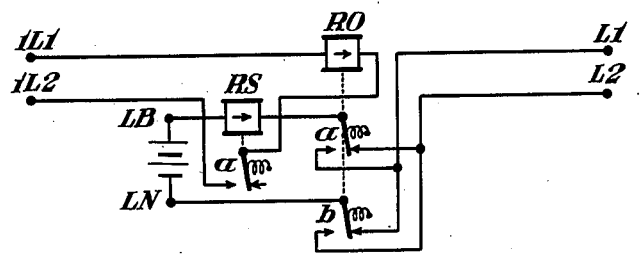
Figure 8:
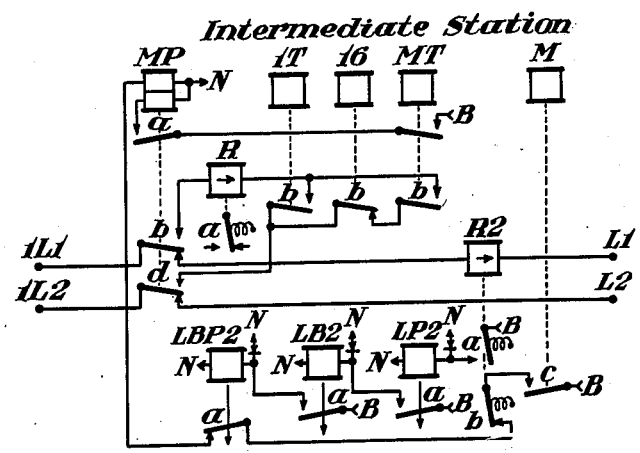
Figure 9:
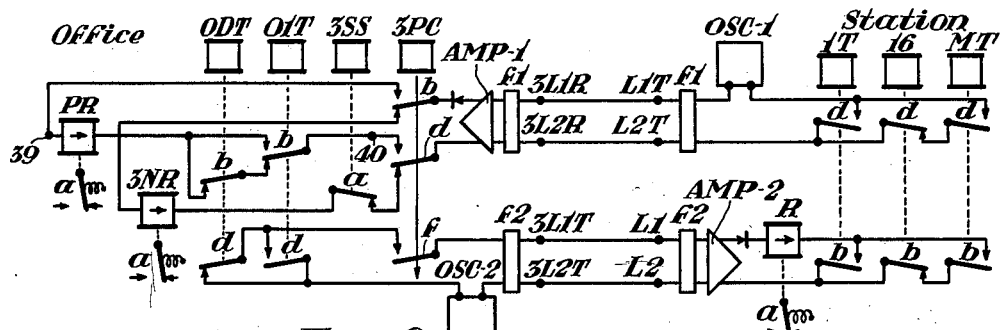
Figure 10:
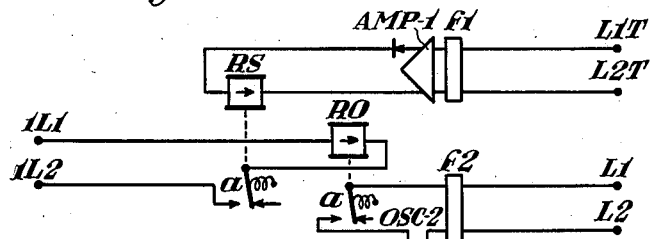
Figure 11:
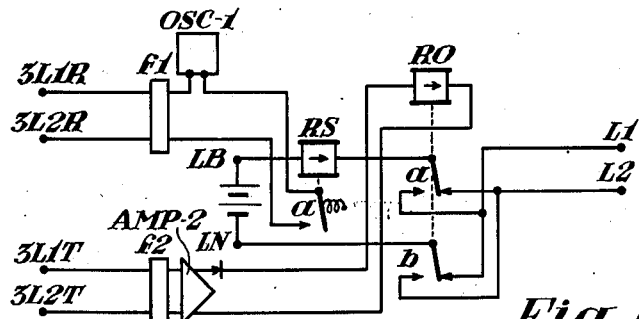
Figure 12:
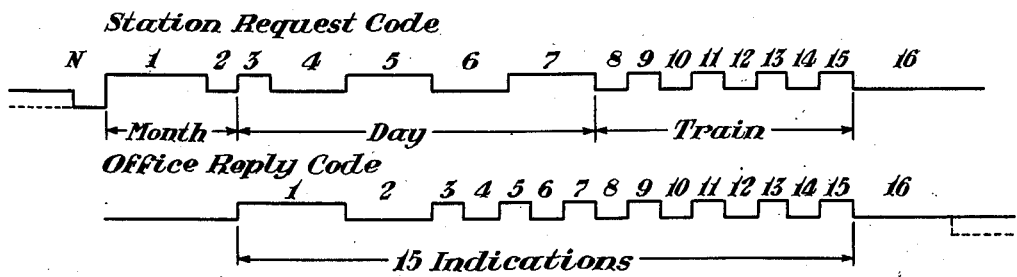

Figs. 6 to 11, inclusive, are diagrams of various line circuits for use with the system of my invention. Fig. 6 shows a typical two-wire central battery line circuit connecting the office apparatus of Fig. 3A with the station apparatus of Fig. 4A; Fig. 7 shows the circuits for a repeater of the 2—2 type which may be interposed in the line circuit of Fig. 6; Fig. 8 shows line connections for the apparatus of Fig. 4A which may be interposed in the line circuit of Fig. 6 for the control of apparatus at intermediate stations, and indicates how a plurality of stations may be connected serially to the same line circuit; Fig. 9 shows a typical four-wire carrier current line circuit, employing currents of two different frequencies $f1$ and $f2$ for the two directions of transmission; Fig. 10 is a circuit plan for a repeater of the 2—4 type which may be interposed between the office apparatus of Fig. 6 and the station apparatus of Fig. 9; Fig. 11 is a circuit plan for a repeater of the 4—2 type which may be interposed between the office apparatus of Fig. 9 and the station apparatus of Fig. 6; and finally, Fig. 12 is a diagram of the line signals constituting a typical request code and the resulting reply code.

Similar reference characters refer to similar parts in each of the views, and in lieu of showing the local sources of current for energizing the various devices, these are identified by the reference characters B and N, designating the positive or supply terminal and the negative or common return terminal, respectively.

The reservation board of Fig. 1A is located at a central office or reservation bureau where the train diagrams are kept and where tickets are sold or reservations made for all of the trains listed on the board. The sale or reservation of space is effected in the conventional manner, and as heretofore, involves the writing of a ticket number and an identification of the purchaser on one of the cards of the diagram for the corresponding train and date. When all of the space of a given type for that train and date is sold or reserved, and also when due to a non-uniform schedule the space is not provided on certain dates, the reservation clerk inserts plugs in the corresponding receptacles to indicate that the space is unavailable.

One purpose of the reservation board is to facilitate the local sale of tickets by enabling the clerks at the central reservation bureau to quickly ascertain what space is available on any train for each day of a three-month period beginning with the current date, thereby avoiding the delay which would otherwise be incurred due to the necessity for locating and making a search through the file of train diagrams.

The reservation board of Fig. 1A comprises a plurality of sections 1SU, 2SU, etc., including one for each type of accommodation listed in the upper portion of the agent's console of Fig. 2. Each section SU comprises a plurality of similar unit portions or panels including one for each car or group of cars of a train carrying the corresponding type of space, which have the same destination. Each panel contains 93 switches each comprising a receptacle in which a plug PL may be inserted to open a normally closed contact, as shown in Fig. 1B. The receptacles as shown are arranged in three rows of 31 each, identified by the letters X, Y, and Z and assigned to different months as indicated by the legends opposite the push buttons XP, YP, and ZP in Fig. 2. The numbers 1 to 31, inclusive, at the top of the board designate the days of the month designated by the receptacles in the corresponding vertical columns. Above these numbers a single row of dummy receptacles is provided in which a single plug PL is inserted to mark the current day of the month. If the current month is January, for example, the fact that no coach seats are available on January 5th on train 310 would be indicated by the presence of a plug PL in receptacle 5 in row X in the panel for train 310 in section 1SU. If that is the current date, the receptacles 5 to 31 in row X in each of the panels designate the 5th to 31st of January, the receptacles in rows Y and Z identify dates in February and March, respectively, and receptacles 1 to 4 in row X identify dates in April at the end of the three-month period. It will be apparent that on any date except the first of the month the receptacles of one row will designate portions of two different months and that each receptacle will designate a day in four different months in the course of a year, as indicated by the designations of the "month" push buttons in Fig. 2. It will be understood that where reservations are made for a 31 or 62 day period, only one or two rows of receptacles are provided in each panel and in the former case the month selector buttons are not needed.

The principal object of the automatic reservation system of my invention is to render the information posted on the reservation board as readily available to any agent at a branch office where tickets are sold and also to agents in distant cities as to the local personnel, and with this in view, each receptacle is provided with a normally closed contact, the opening of which manifests that a plug has been inserted to indicate that the corresponding space is unavailable. The sale of space is effected in the conventional manner by telephone communication between the agent and a reservation clerk at the central office after the desired space or an acceptable alternative has been shown to be available by operation of the reservation system. The advantage of the system resides in a saving in time in making a selection of space which is sufficient to materially reduce the cost of sales, and in the fact that it reduces the use of other communication facilities.

Each agent's console, as shown in Fig. 2, includes in its lower portion a combination of dials and self-latching push buttons which may be positioned to designate each different train and date and to initiate the transmission of a request code to the office the elements of which identify such train and date. The control devices comprise a date dial DD, having 32 positions, Nos. 1 to 31 of which correspond to the days of a month, the three "month" push buttons XP, YP, and ZP, already mentioned, a train dial TD for rotating a cylindrical drum about a vertical axis to any one of 32 positions, identified by numbers 1 to 32 on the dial in each of which the drum is adapted to display train designations at eight different levels identified by the letters A to H, and finally, a group of eight self-latching push buttons AP to HP, inclusive, for selecting the train of which the designation is displayed at the corresponding level. It will be evident that each space occupied by a train designation may be identified by its coordinates such as 32–H for the space occupied by the train number 416 in Fig. 2.

The control portion also includes certain auxiliary apparatus, comprising a cancelling button CNP, a code indicator lamp SE which is lighted steadily when a code is stored for transmission and intermittently when a code is being transmitted or received, a push button CLP by which the code system may be caused to operate a call signal to enable the agent to call a reservation clerk to the telephone, and a lamp CLE for indicating the response of the equipment to the operation of button CLP.

Each request code comprises a series of 16 steps or code elements, as illustrated in Fig. 12, in which steps 1 to 15 are either long or short as determined by the energized or deenergized condition of the corresponding one of a series of transmitter control circuits having the terminals 1A to 15A, which, as shown in Fig. 4C, are either connected to one terminal B of the local source of current or left open, depending upon the positions of the dials and push buttons. As will be clear from Fig. 4C, the circuits 1A to 15A are arranged in groups for control by the different dials and buttons, and the circuits of each group may be energized in various binary code combinations corresponding to the total number of push buttons or dial positions.

In setting up a code combination, the train button comprising one of the group of buttons AP–HP is operated last, and the code is initiated by picking up a starting relay CA, Fig. 4C, over a contact 65 controlled by a latch bar which closes momentarily when any one of these buttons is pressed. The latch bar releases and opens contact 65 when the button is fully depressed and holds the button in its depressed position, releasing it when another button of the group is pressed.

The typical request code illustrated in Fig. 12 is for the 16th of March (or of June, September or December, whichever is within the 93 day period beginning with the current date) for space on train No. 310, posted in sections 1SU and 2SU in the reservation board of Fig. 1A. It is to be understood that this train number is in the train drum position having the coordinates 1–A, consequently it will appear in row A upon the rotation of the train dial TD of Fig. 2 one step clockwise from position 32 to position 1. As will be clear from Fig. 4C, pressing button ZP in Fig. 2 opens the connection to wire 2A only, consequently the first step of the code will be long and the second step short, as shown in Fig. 12. The date dial DD is rotated 180 degrees to position 16, corresponding to the 16th day of the month, where cam No. 1 opens the connection to wire 3A, while the cam contacts connected to wires 4A–7A are closed so that the third step will be short and steps 4 to 7 will be long; dial TD in position 1 opens the connections to wires 8A to 12A, and the pressing of button AP opens the connections to wires 13A to 15A, and momentarily closes contact 65, making each of the steps 8–15 a short step as shown in Fig. 12, and also picking up relay CA to initiate the transmission of the request code.

In response to a request code, selectors at the central office establish connections with the plug switches of the reservation board for the corresponding date and train, and cause the immediate transmission of a reply code to the station at which the request code originated, of the type illustrated in the lower portion of Fig. 12, during which a reception connector relay CC in the console in which the request code originated is operated to render a series of indication stick relays 1K–15K responsive to the energization of wires 1B–15B on the successive steps of the reply code, to light an indication lamp such as 1KE in the upper portion of the console, for each type of available space on the designated train and date.

A feature of my invention is that each code initiated by the operation of a relay CA is stored by that relay until a communication circuit to the office is established, whereupon a transmission connector relay CB, controlled by relay CA, causes the transmission of a request code. The line connections are maintained and a reception connector relay CC is operated by relay CB on the 16th step of the request code so that each request code is followed by a reply code without interruption of the connection between the office and the station of origin. An advantage of this arrangement is that the station identifying code elements heretofore required in code communication systems of this character are not needed, removing a limitation as to the number of stations which may use the same set of office apparatus.

A feature of the agent's console of my invention is that the indications displayed as the result of the transmission of a reply code may be identified as belonging to the particular train and date designated by the last request code transmitted from the console, by reference to the positions of the dials and push buttons in the lower portion of the console. This is by reason of a provision of a lockout relay KD in Fig. 4C which governs the lighting of the series of lamps AE to HE for illuminating the selected position on the train drum. Lamp UE is located back of the exposed position of the drum DD and is normally lighted to illuminate the number displayed by that drum. One of the lamps AE to HE becomes lighted when the corresponding train button is pressed to illuminate the train number displayed at the corresponding level on the train drum. Relay KD is controlled over contacts actuated by the drums DD and TD and by the buttons at the left of the console in such manner that the indication relays 1K-15K are released upon a change in position of any of the control devices except the buttons AP-HP, while the operation of one of the latter buttons cancels the stored indications due to the operation of relay CA. It follows that the indications of the available space persist only as long as the control devices are left in positions identifying the train and date to which the indications apply.

For a general understanding of the selecting portion of the code equipment at the office it will suffice to point out that in response to each long step of a request code, a corresponding one of a series of storage relays 1P-15P at the office, shown in Fig. 3D, is picked up with the same effect as if the station wires 1A-15A were connected directly to the wires 1D-15D in the pickup circuits for these relays. It follows that in the case of the code illustrated in Fig. 12, only the relays 1P and 4P-7P are energized, and as may be readily traced from Fig. 3D, relays 1P and 2P prepare a circuit from the supply wire 55 to wire 60 for a month relay 3M, Fig. 3E, selected by button ZP, relays 3P-7P prepare a circuit from wire 56 to wire 16U in a group of circuits 1-32U, identifying the 16th day of the month, relays 8P-12P prepare a circuit from wire 57 to wire 1S identifying position 1 of the train drum, and relays 13P-15P prepare a circuit AG for relays A1G and A2G identifying the level A on the train drum which are energized over wire 55 to pick up a selector relay 1AS for the train 310 in question.

It will be understood that a selecting relay S, identified by a prefix 1A to 32H, corresponding to the coordinates of the various positions on the train drum, is provided for each train destination posted, and that the circuits of Fig. 3D, although shown in condensed form, are adapted to provide connections for 32 groups of eight selector relays each.

For each unit panel in the reservation board of Fig. 1A, a selector comprising a rotary stepping switch such as the one identified as 1ST1 in Fig. 3E is provided, these being of a conventional type having four banks of 40 contacts each. The contact points P1-P31 of three of the banks (identified as 1X1, 1Y1, and 1Z1) are connected to the plug switch contacts PL1-PL31 of the panel, for the corresponding dates and levels, the other terminal of each plug switch being connected to the supply terminal B of the local source of current. The contacts P1-P32 of the fourth bank U1 are connected to correspondingly numbered terminals of the wires 1-32U, one of which terminals is supplied with energy according to the date selected, as already explained. Each stepping switch is actuated by a stepping magnet SM having a "self-stepping" control circuit which includes a contact which opens when the magnet is energized and having its terminal identified by the designation of the stepping switch on a terminal board in Fig. 3D. The terminal board is equipped with adjustable jumpers so arranged as to enable the control terminal of any stepping switch to be connected to one of the contacts $a$ to $h$ of the selecting relay S for any train, so that energy will be supplied to the stepping switch magnet to initiate its step-by-step operation whenever the selecting relay S for the train to which the corresponding panel is assigned becomes energized.

This arrangement has the advantage of facilitating changes in the posted information in response to changes in schedule or make up of trains. The posting of train 310, for example, involves merely assigning to the train an available selector relay 1AS; marking the train number on an available panel in each section of the reservation board which designates a type of accommodation provided by train 310; inserting jumpers in the terminal board referred to, so as to connect the contacts of relay 1AS to the stepping relay control circuits for these panels, and informing the agents to mark the train number in the space having the coordinates 1-A on their train drums. Likewise, the stepping switch 1ST2 for the second panel in section 1SU is controlled by the selector relay 2AS, consequently the corresponding train number 310 should appear in the space having the coordinates 2-A on the train drum.

Although the agent's console is normally connected to a line circuit associated with a particular reservation board, it may readily be switched to another line circuit extending to a reservation board in another city upon which the information posted relates to trains not listed on the agent's train drum. In such cases the agent is provided with a chart having the coordinates 1 to 32 and A to H upon which the trains on the distant reservation board are listed to enable him to move his train drum to the correct position and to operate the proper train button.

On the 16th step of the request code being described, the selector relay 1AS picks up, and completes circuits over its contacts $a$ and $b$ to energize the control terminals for the stepping switches 1ST1 and 2ST1 for the top panels in the sections 1SU and 2SU of the reservation board of Fig. 1A, so that these stepping switches all advance to a position where their magnets SM are held energized over circuits completed over one of the holding circuit terminals 1-32U and the contact arms of the lower banks such as 1U1. In the present case, wire 16U is supplied with energy so that the switches stop on point P16 and the month selector relay 3M, which also is energized, connects the contact arms of the Z banks of all of the stepping switches to the correspondingly numbered wires 1C-15C. In the present example, switch 1Z1 connects terminal B to wire 1C and switch 2Z1 connects terminal B to wire 2C, but wires 3C-15C are left open because no other stepping switches are operated.

The wires IC–15C are included in the control circuits for the office code transmitter which when supplied with energy cause the corresponding steps of a reply code to be long steps, as indicated in Fig. 12, with the result that energy is supplied to the wires IB–15B of Fig. 4C to pick up corresponding ones of the indication relays IK–15K at the receiving station.

It will be seen that the agent's console has one lamp for each section SU of the reservation board and that in the example being described the indication lamps IKE and 2KE are lighted due to the closing of circuits at the office over the control wires IC and 2C for sections ISU and 2SU, respectively, which are supplied with energy over the contact points of a particular plug switch P16 in each section, for the month selected by relay 3M and for the day selected by the stepping switches IST1 and 2ST1 actuated by the selector relay IAS for train 310.

At the end of the reply code, the various code system relays release and each operated stepping switch advances to its normal position in a conventional manner due to the closing of the contact a of an off normal switch ONS. A checking relay ST—CK, Fig. 3A, is provided with a pickup circuit closed during the transmission of a reply code and a stick circuit including wire 16C and the contacts b of all of the off normal switches ONS. Relay ST—CK serves to open the coding circuits and to operate a buzzer in the event any stepping switch fails to return to normal within the time period of the 16th step of a reply code.

As shown in Fig. 4C, the agent's console also includes a cancelling button CNP for deenergizing the equipment by opening the connection to terminal N of the source, and a thermal relay THR which disconnects terminal N in the event the starting relay CA or the delivery relay CC remains energized for an abnormally long period.

Additional agent's consoles at the same station may be connected to the station coding unit for noninterfering operation by connecting the wires 17–20, inclusive, of each added console similar to Fig. 4C to the wires 17A–20A of the one which is connected directly to the station coding unit, and by connecting the wires 1–16A and 1–16B to corresponding terminals in each console.

The apparatus also includes means by which the agent is able to send a special check code of all long steps to cause the return of a similar reply code to operate all of his indication relays for checking purposes.

The check code of fifteen long steps is transmitted by operating button HP only. Buttons XP, YP, and ZP are not operated and dials DD and TD are placed in positions 32 as shown in Fig. 4C, so that terminal B is connected to each of the wires IA–15A. Each of the relays IP–15P of Fig. 3D pick up, causing relay TCK, Fig. 3E, to be energized over wire 61, in place of a selector relay S and a month relay M. Energy is supplied over the contacts a–o of relay TCK to each of the transmitter control terminals IC–15C so that each of the indication relays IK–15K is energized in response to this reply code.

The coding apparatus at the office and stations by which the codes of Fig. 12 are transmitted and received is a modification of that of my prior Patent No. 2,411,375 and functions in a generally similar manner. The coding units at the office and station are generally similar and corresponding relays bear similar designations, each office relay which has a counterpart at the station being distinguished by the prefix O.

The station coding unit, shown in Figs. 4A and 4B, is governed by a line relay R of the biased polar type which responds to code impulses of a given polarity only, as illustrated in Fig. 12, and by the operation of its contact a energizes a series of counting relays 1 to 8 one at a time on the corresponding code steps. On step 8, a chain repeat relay CR is operated and then the counting relays 1 to 7 operate through a second cycle on steps 9 to 15, and a final counting relay 16 is operated in place of relay 8 on the 16th step. Contacts c and d of the counting relays govern the transmitter control circuits IA–15A above referred to and their contacts e and f govern receiving circuits IB–15B for the control of the indication relays IK–15K which pick up to register the long steps of a code.

Contact b of the line relay R controls a series of timing relays IL, 2L, LP, LB, and LBS for governing the coding operations. All of these relays pick up at the beginning of the first step of a code, and then relays IL and 2L are energized alternately over contact b in its opposite positions. Relay IL releases on each long odd-numbered step, while relay 2L releases on each long even-numbered step so as to operate the relays by which the long steps of a received code are registered. The release of relay IL or 2L opens the circuit for relay LP, the release of which at the transmitting station measures the length of the long steps. Relays LB and LBS remain picked up for the duration of a code and release successively on the 16th step. These relays serve to space the successive codes and to reset the apparatus properly to normal in the event a code is interrupted.

The station coding unit is conditioned to transmit a request code by energizing a master relay M, Fig. 4A, which activates a transmitter relay IT and an auxiliary relay 2T, which relays are controlled over back contacts of the odd and even-numbered counting relays respectively to generate the short code steps, and over front contacts of relays IL or 2L and LP to generate the long code steps. The master relay M is picked up over wire 17 by the starting relay CA in the agent's console, but only when the coding apparatus is in its normal at rest condition. The transmitter relay IT transmits the code either by the operation of its contact b, which is included in the line circuit in series with the line relay R, or by the operation of a contact d included in a second line circuit. The station coding unit also includes a transmission totalizing relay MT which picks up on the last step of a requests code and shunts the transmitting contacts of relay IT to enable the office transmitter relay OIT to transmit the reply code, and a reception totalizing relay DT which picks up on the last step of the reply code to release relay MT.

The office coding unit, shown in Figs. 3B and 3C, includes counting, timing, and transmitter relays similar to those at the station, controlled by a similar line relay PR, and also include an additional timing relay LBP. In addition, the office coding unit includes a delivery relay D which picks up on the first step of a request code and renders the storage relays IP–15P responsive on the successive steps of that code, and also includes a reception totalizing relay ODT and a repeater DTP controlled by the delivery relay D which pick up on the last step of a request code. Relay ODT removes the shunt from the transmitting contacts of relay OIT to enable it to control the line circuit in place of the station transmitter relay IT, and relay DTP operates the office master relay OM to initiate the transmission of the reply code. A transmission totalizing relay OMT is also provided, which picks up on the last step of a reply code to terminate the transmission.

In addition to the foregoing, when more than one line circuit is used, line switching apparatus is provided at the office for each line circuit as shown in Fig. 3A, comprising a biased polar line relay NR, a pole changer or connector relay PC operated by the associated line relay to connect the corresponding line circuit to the office coding unit, and a station sequence relay SS operated by the associated relay PC by which the office coding unit is connected in sequence to each of the line circuits which have codes stored for transmission.

The two-wire type of line circuit which is a feature of my invention is illustrated by the one having the line terminals ILI and IL2, in Fig. 3A, which are connected by line wires to terminals L1 and L2 of Fig. 4A. This line circuit is shown in its entirety in Fig. 6, from which it will be seen that the positive terminal LB of the line battery at the central office is normally connected to the lower line wire which extends to the line terminal L2 at the station, while the negative terminal LN of the line battery extends to terminal LI, and that the line circuit is open at contacts b of relays IT and MT. The transmitter contact b of relay IT closes when a request code is initiated, with the result that current flows through the biased polar relays INR and R in opposite directions so that relay INR is operated but not relay R. This occurs at the point indicated by the legend N in the code diagram of Fig. 12. As explained hereinafter in connection with Fig. 3A, the office coding unit in its normal at rest condition supplies energy over wire 35 and the reverse contact a of relay INR to the pole changer relay IPC, so that if the office coding unit is in condition to receive the code, relay IPC picks up, and as shown in Fig. 6, its contacts insert the coding unit line relay PR in the line circuit in place of relay INR, reversing the line polarity so that relays PR and R pick up in series to begin step 1 of the request code, which is then transmitted by relay IT as illustrated in Fig. 12. On the 16th step of the request code, relay MT picks up to shunt the transmitting contact of relay IT and relay ODT picks up to remove the shunt from the transmitting contact of relay OIT, enabling relay OIT to transmit the reply code illustrated in Fig. 12. Relay IPC is released by the totalizing relay OMT at the beginning of the 16th step of the reply code, and the coding units then assume their normal at rest condition with all relays released as shown. The slow release relay ISS, however, remains in its picked-up position after terminal B is reconnected to wire 35 and holds the circuit for relay INR open long enough to enable relay 2PC or 3PC to be picked up in preference to relay IPC, for the reception of the next code, in the event relay 2NR or 3NR stands reversed.

It will be noted that during the line open periods of the reply code transmitted by relay OIT, the line wires are connected together over front contact b of relay ODT and back contact b of relay OIT. This provides a discharge path for energy stored in the line during the line closed period and by reducing the code distortion, adapts the system to use line circuits in cable.

In Fig. 6 a device designated LPF is shown connected in series with the line wires at each end of the circuit. It is to be understood that these are conventional low pass filters for enabling the same line wires to be used simultaneously for voice frequency or carrier current communication.

Referring now to Fig. 7, the novel repeater here shown comprises two biased line relays RO and RS and a line battery of suitable voltage. When the repeater of Fig. 7 is interposed in the line circuit of Fig. 6, voltage is supplied to terminals ILI and IL2 by the office line battery of a polarity to pick up relay INR but not relay RO, when contact a of relay RS is closed, and is supplied to terminals L1 and L2 by the line battery at the repeater station of a polarity to pick up relay RS but not relay R, when contact b of the station transmitter relay IT is closed. That is, relay IT picks up relay RS, which picks up relay INR, with the result that relay IPC picks up to reverse the polarity supplied to terminals ILI and IL2 so that relays PR and RO pick up in series. Relay RO reverses the polarity supplied to terminals LI and L2 so that relay R picks up in series with relay RS. During the transmission of a request code, relay RS repeats the operation of relay IT, relays PR and RO repeat the operation of relay RS, and relay R is picked up by relay RO and released by relay IT. During the transmission of a reply code, relay RS is held energized by the closing of contact b of relay MT; relays PR and RO repeat the operation of relay OIT, and relay R repeats the operation of relay RO. It will be seen that interposing the repeater delays the response of relay R to the operation of the associated transmitter IT by the time of operation of relays RS and RO, but since quick acting line relays are used, this is of negligible effect at the code speeds employed, which conventionally is at the rate of ten short steps per second.

Referring now to Fig. 8, one or more intermediate stations arranged as here shown may be interposed in the line circuit of Fig. 6, the additional equipment needed comprising a line relay R2 in series with the line, three timing relays LP2, LB2, and LBP2 controlled by relay R2 and a line sectionalizing relay MP for connecting the coding unit to the line. The timing relays function like the relays L in the coding units, to enable a request code to be initiated only when the line circuit is in its normal at rest condition. Under this condition, relay MP picks up to disconnect the remote station upon the energization of the master relay M to initiate a request code, and is held energized by relay M or by the totalizing relay MT until the end of the corresponding reply code over circuits which will be readily understood from the drawings.

Each of the connector relays PC in Fig. 3A is adapted to connect the office coding unit to a four-wire carrier current line circuit as illustrated by the circuits controlled by relay 3PC, shown separately in Fig. 9.

For controlling the carrier currents, the relays IT, MT, 16, OIT, and ODT are each provided with a second transmitting contact d. When contact d of relay IT is closed, an oscillator OSC-I at the station supplies current of a suitable frequency over a one-way line channel through filters $f1$ which selectively pass that frequency to an amplifier AMP-I, the output of which is rectified in a conventional manner and supplied to relay 3NR or PR in place of battery current.

The closing of contact d of relay IT thus serves to initiate transmission by energizing relay 3NR, which picks up relays 3PC and 3SS in the usual manner and conditions relay PR to receive a request code transmitted by relay IT.

When relay 3PC picks up, it supplies current of a second frequency from an oscillator OSC-2 over another one-way line channel through the selective filters f2 to an amplifier AMP-2, the output of which is rectified and supplied to relay R, which therefore responds to the operation of contact b of relay IT during the transmission of the request code in the same manner as in Fig. 6.

During the transmission of the reply code, contacts d of relays 16 and MT are closed so that oscillator OSC-1 supplies carrier current steadily to amplifier AMP-1, this being coded by contact b of relay OIT to operate relay PR. At this time contact d of relay ODT is open, and the operation of contact d of relay OIT causes oscillator OSC-2 to supply coded current to amplifier AMP-2 to operate relay R.

It will be evident that the relays PR and R are operated in the required manner in each instance.

The interchangeability of the two types of line circuit will be evident from a consideration of the repeaters of Figs. 10 and 11, each of which includes two line relays RS and RO similar to those of Fig. 7.

When the repeater of Fig. 10 is interposed between the right-hand portion of Fig. 9 and the left-hand portion of Fig. 6, the closing of contact d of the station transmitter IT operates relay RS by rectified current from oscillator OSC-1, and relay RS picks up relay INR at the office with the result that relay IPC picks up to reverse the polarity of the current supplied to relay RO and then relays PR and RO pick up in series. Relay RO causes rectified current from oscillator OSC-2 at the repeater station to be supplied to the station line relay R, which picks up over contact b of relay IT. During the transmission of a request code, relay RS repeats the operation of relay IT, relays PR and RO repeat the operation of relay RS, and relay R is picked up by relay RO and released by relay IT. During the transmission of a reply code relay RS is held energized by relay MT, relays PR and RO repeat the operation of relay OIT, and relay R repeats the operation of relay RO, all of which is the same as in the case of Fig. 7.

When the repeater of Fig. 11 is interposed between the left-hand portion of Fig. 9 and the right-hand portion of Fig. 6, the closing of contact b of relay IT operates relay RS, which supplies rectified current from an oscillator OSC-1 at the repeater station to relay 3NR, with the result that relay 3PC picks up to supply current from oscillator OSC-2 to pick up relay RO, which picks up relay R. During the transmission of a request code, relays RS and R repeat the operation of relay IT and relay PR repeats the operation of relay RS. During the transmission of a reply code, relays PR and RO repeat the operation of relay OIT and relay R repeats the operation of relay RO. It will be seen that the repeater of Fig. 11 is free from the slight amount of code distortion produced by those of Figs. 7 and 10.

When the number of line circuits and stations is large, it may be desirable to provide two coding units and sets of selecting apparatus at the office such as shown in Figs. 3A-3E for scanning the same reservation board, in order to reduce delays in operation. For example, as shown in Fig. 5, a coding unit CU-1 may serve certain line circuits having the terminals 1L1—1L2, 3L1—3L2, etc., and another coding unit CU-2 may serve another group of line circuits having the terminals 2L1—2L2, 4L1—4L2, etc., the stepping switches controlled by each coding unit having connections to the same set of plug switches in Fig. 3E, so as to enable any two stations, in different groups, to transmit codes at the same time.

If the two coding units are independent of one another, it may occur that all of the stations which have codes to transmit at a given time are in the same group and that the office coding unit for the other group is idle at the time.

In the modification shown in Fig. 5, means are provided by which either coding unit is available for use by all of the stations of both groups. In addition to the connector relay PC for connecting each line circuit to the office coding unit with which it is normally associated, as in Fig. 3A, an auxiliary connector relay PCA is provided for connecting the line circuit to the other coding unit if this is available but the one to which it is connected by its relay PC is not available.

For example, if coding unit CU-1 is idle as manifested by the energization of its terminal 35, the operation of the line relay 1NR, for example, picks up relay 1PC to connect the line terminal 1L1 to the coding unit terminal 40 and thence in Fig. 3B through relay PR to the battery terminal LB, and to connect the other terminal 1L2 of the same line circuit to the other battery terminal N.

If, at this time, the coding unit CU-2 is also idle, energy is supplied from its terminal 35 momentarily over contact b of relay 1NR to relay 1PCA, but due to the resistor in its circuit, relay 1PCA operates more slowly than relay 1PC and does not pick up because its circuit is opened at back contact e of relay 1PC.

Relay 1PCA operates only in the event coding unit CU-1 is in use and unit CU-2 idle, and when operated, connects the line terminal 1L1 to terminal 40 of coding unit CU-2 which is connected through its relay PR to battery terminal LB, and connects terminal 1L2 to terminal LN.

Similarly, the line terminals 2L1 and 2L2 which normally are connected to coding unit CU-2 by the operation of relay 2NR are connected to coding unit CU-1 by the operation of this relay if coding unit CU-2 is in use and coding unit CU-1 is idle.

Each relay PCA in Fig. 5 governs a station sequence relay SSA which like the relay SS prevents the reenergization of the associated relay NR at the end of a code provided some other relay NR is energized.

Having thus described the principal features of the automatic reservation system of my invention, I shall now describe in step-by-step fashion the operations involved in the transmission and reception of a typical request code and of the corresponding reply code. The code to be described is that illustrated in Fig. 12, indicating the availability of the space posted in sections 1SU and 2SU of the reservation board of Fig. 1A, for train No. 310 on March 16th.

As already explained, the agent rotates the date dial DD of Fig. 2 to position 16, presses button ZP, rotates the train dial TD to position 1 where the train number 310 will appear at level A, and completes the selection by pressing button AP. The initial movement of dial DD or TD by operation of the 32 tooth cam shown in Fig. 4C (or the operation of the latch bar controlled by button ZP, whichever is operated first) picks up the stick relay KD over contact 62, 63 or 64 and thereby extinguishes all of the indication lamps that may be lighted by releasing all of the operated relays IK–I5K. The operation of button ZP releases button XP or YP, if latched down, and the operation of button AP moves the latch bar to release any train button that is latched down, and to complete a pickup circuit for the starting relay CA, which extends from terminal N at contact a of the cancelling button CNP over the contact of the thermal relay THR, through the winding of relay CA and thence over the latch bar contact 65 to terminal B at back contact a of relay CC.

The latch bar is arranged so that contact 65 closes momentarily when one of the buttons AP–HP is pressed even though the button is initially in its latched position.

Relay CA picks up and completes a stick circuit over its front contact a and back contact a of relay CC, and the operation of contact e of relay CA lights lamp SE and releases relay KD, which by closing its contact c lights lamp AE back of the exposed train number in level A of the train drum in Fig. 2, to illuminate this number. By closing its contact c, relay CA picks up the master relay M of the station coding unit over wire 17 and back contacts of certain relays in Fig. 4A which contacts are included in the circuit to insure that the circuit will not be closed again until the coding unit has returned to its normal at rest condition. The closing of contact d of relay M picks up the transmitter relay IT over a circuit which may be traced from terminal N through the relay winding, back contact b of relay 2T, front contact d of relay M, back contact g of relay MT, wire 27 and thence to terminal B over back contacts g of the counting relays 1, 3, 5, and 7. Relay 2T picks up over front contact c of relay IT and contact f of relay M. Relay IT completes a stick circuit over its own front contact a and front contact e of relay M having one branch which extends to terminal B at back contact e of relay LBS, and another branch which extends over front contact b of relay 2T and thence as already traced over wire 27 to terminal B.

The closing of front contact b of relay M completes a circuit over back contacts d of relays LBS and 2T, wire 18 and front contact b of relay CA to pick up relay CB, and when relay 2T picks up its contact d completes a stick circuit over wire 19 to hold relay CB picked up. The closing of contact r of relay CB connects lamp SE over wire 16A to terminal B at back contact c of relay LBS.

The closing of the transmitting contact b or d of relay IT energizes the office line relay INR or 3NR for the associated line circuit as indicated in Fig. 6 or 9, provided a line circuit is available. Assuming that the line circuit is of the direct current type shown in Fig. 6, relay IPC is energized over the circuit from terminal N at contact d of the check relay ST—CK, Fig. 3A, contact b of a cut-out switch CB, the winding of relay IPC, back contact b of relay ISS, contact a of relay INR, and extending to terminal B over back contacts in Fig. 3B which when closed indicate that the office coding unit is in its normal at rest condition. Relay IPC picks up, completing its stick circuit which extends over its own front contact a, wire 37, and back contacts c of relays OMT and DTP to terminal B at back contact e of relay OLBS. Relay IPC energizes relay ISS, reverses the line polarity and releases relay INR. The reversal of line polarity constitutes a "go ahead" signal for the transmitting station and marks the beginning of step one of the request code shown in Fig. 12. The line circuit as set up for the transmission of the request code may be traced from the line battery terminal LB, Fig. 3A, over wire 39, the winding of relay PR, back contacts b of relays ODT and OIT, wire 40, front contact b of relay IPC to terminal IL1 and over the upper line wire to terminal L1, Fig. 4A, through the winding of relay R, over contact b of relay IT to terminal L2, over the return line wire to terminal IL2, Fig. 3A, and over front contact d of relay IPC to the other line battery terminal LN.

Relays R and PR operate in unison. In Fig. 4B, the counting relay 1 picks up over wire 23, back contacts b of relays LB and LBS, and the left-hand contact a of relay R, and in Fig. 4A, the timing relays IL an 2L pick up over the left-hand contact b of relay R, energizing relays LP, LB, and LBS in cascade, while in Fig. 3C, the counting relay O1 is picked up by relay PR over a similar circuit including wire 43 and relays O1L and O2L pick up, and in addition the delivery relay D picks up over the circuit extending to terminal N over wire 36 and to terminal B over back contact d of relay OLBS and the left-hand contact a of relay PR. Relay D lights lamp RE to indicate the reception of a request code. Relays OLP, OLB, and OLBS pick up in cascade and relay OLB energizes relay LBP.

The closing of front contact d of relay OLBS connects terminal B over front contact a of relay D and front contact f of relay OLB to relay D, completing a stick circuit over which relay D is held energized. Front contact f of relay OLB closes to maintain terminal B connected over back contacts C of relays DTP and OMT to wire 37, to hold relay IPC energized, and the closing of front contact b of relay LBP completes a stick circuit over wire 38, to hold relay ISS energized. The closing of contacts c of relays LBP and D prepares circuits for energizing the register relays IP–I5P over wire 51 or 52 in response to the release of relay O1L or O2L during the long steps of the request code, and connects terminal B to wire 16D to prepare stick circuits for the register relays.

The closing of front contact b of relay OLB connects the left-hand contact a of relay PR to the wire 42 over which the odd-numbered counting relays are successively energized and thereby completes a stick circuit for relay O1, and the closing of contact c of relay OLB connects the right-hand contact a of relay PR to wire 44 over which the even-numbered counting relays are successively energized. The closing of front contact f of relay OLBS transfers the circuit for relay O1L to the right-hand contact b of relay PR so that relay O1L becomes deenergized when relay OLBS picks up on the first code step.

In Figs. 4A and 4B, the counting relay circuits over wires 22 and 24 are prepared, and relay IL is deenergized, by the operation of the corresponding timing relays LB and LBS. In addition, the circuit for the code indicator lamp SE is extended over wire 16A and front contact c of relay LBS to the right-hand contact a of relay R so that lamp SE repeats the code, being lighted during each even-numbered step. Relay M is held energized over its contact a and front contact g of relay LB and wire 17, which is connected to terminal B at contact c of relay CA, and energy is supplied over front contact b of relay M and front contact d of relay LBS to wire 19 to hold relay CB picked up. After relays 1 and LBS pick up, terminal B is disconnected from relay 1T at back contact g of relay 1 and also at back contact e of relay LBS, but relay 1T is held energized over a holding circuit including its front contact a, front contact e of relay M, front contact b of relay LP, and front contact c of relay 1L, in parallel, wire 28, back contact c of relay CR, front contact c of relay 1, wire 1A, contact c of relay CB, and extending to terminal B over the normally closed contacts a of the push buttons XP and YP. This circuit is opened by the release in cascade of relays 1L and LP to release relay 1T after a time period corresponding to a long first step as indicated in Fig. 12, during which relay O1L, Fig. 3B, releases substantially in unison with relay 1L and completes a circuit from terminal B at its back contact d over wire 51, back contact e of relay OCT, front contact e of relay O1, wire 1D through relay 1P to terminal N. Relay 1P picks up and is held energized over a stick circuit including its contact a, wire 16D and extending to terminal B at contact c of relay LBP.

When relay 1T releases to begin the second step, relays R and PR release, the counting relays 2 and O2 pick up over wires 26 and 46, respectively, relays 1L, O1L, LP, and OLP pick up, relays 2L and O2L become deenergized, and relays 1 and O1 release. Relay 2T is held energized only until relay 2 picks up, over a stick circuit completed over contact f of relay M and back contact c of relay 1T which includes contact a of relay 2T, wire 29 and back contacts g of the even-numbered counting relays. Relay 2T also has a holding circuit for generating a long second step which includes contacts c of relays 2T, 2L and LP, wire 30, back contact d of relay CR, front contact c of relay 2, wire 2A, contact d of relay CB, and back contacts b of buttons XP, YP, and ZP, but this circuit is open at contact b of button ZP, consequently relay 2T is released along with relay 1 when relay 2 picks up. Relay 1T then picks up over the circuit which includes back contact b of relay 2T and extends to terminal B over wire 27, to make the second step a short step. Relay O2L does not release on this step and consequently the office register relay 2P is not operated.

When relay 1T picks up to begin the third step, relays R and PR pick up, relays 2L and O2L are reenergized and relays 1L and O1L deenergized, relays 3 and O3 pick up and relays 2 and O2 release. The closing of front contact c of relay 1T picks up relay 2T and relay 2T connects wire 27 over its front contact b to the stick circuit for relay 1T which includes wire 27 and back contacts g of the odd-numbered counting relays. The holding circuit for relay 1T which includes wire 28, now extends over back contact c of relay CR and front contact c of relay 3, wire 3A and contact e of relay CB and is open at the single tooth cam No. 1 of dial DD in position 16, so that relay 1T releases due to the opening of the circuit including wire 27 when relay 3 picks up and makes the third step a short step.

Relay O1L does not release on this step and consequently the office register relay 3P is not operated.

When relay 1T releases to begin the fourth step, relays R and PR release, relays 1L and O1L are reenergized and relays 2L and O2L deenergized, relays 4 and O4 pick up and relays 3 and O3 release. Relay 2T is held energized over the holding circuit including contacts a of relays 2T and LP, wire 39, back contact d of relay CR, front contact c of relay 4, wire 4A, contact f of relay CB and the closed contact operated by cam No. 2 of dial DD, which circuit opens when relays 2L and LP release in cascade to make the fourth step a long step. Relay O2L releases along with relay 2L and completes a circuit over its contact d, Fig. 3B, wire 52, back contact f of relay OCR, front contact e of relay O4, wire 4D, to pick up the storage relay 4P, Fig. 3D. Relay 4P is then held energized over its stick circuit which extends to terminal B over wire 16D.

The remainder of the request code is generated in the manner described, that is, steps 5 and 7 are similar to step 1, step 6 is similar to step 4, and steps 8 to 15 are similar to steps 2 and 3. On the 8th step, the chain repeat relay CR, Fig. 4B, picks up on energy supplied over contact d of relay LB, wire 21 and contact f of relay 8, and prepares circuits by which relay 1 is operated on the 9th step, causing relays 2 to 7 to be operated on the 10th to 15th steps, respectively, and relay 16 to be operated on the 16th step, and in Fig. 3C, relay OCR, relays O1 to O7, and O16 are operated over similar circuits in unison with the corresponding relays at the station. Contacts c, d, e, and f of relays CR and OCR function in an obvious manner to enable the counting relays to control different circuits on the second cycle of operation.

When the counting relays 16 and O16 pick up on the final step of a request code, the transmission totalizing relay MT, Fig. 4A, picks up over contacts c of relays 16 and M, and the reception totalizing relay ODT, Fig. 3B, picks up over contact c of relay O16, contact b of relay D, and contact a of relay LBP.

Contact g of relay MT opens the pickup circuit for relay 1T to prevent its further operation; contact c of relay MT completes a second connection from terminal B to wire 19 to maintain relay CB energized after relay M is released; its contact h connects terminal B to wire 20 to pick up relay CC, contact a of which connects terminal B to wire 17 to hold relay MT picked up, and releases relay CA; contacts b and d of relay MT prepare shunts for the transmitting contacts of relay 1T which are closed by relay 16 at the end of the 16th step, and contact f of relay MT connects terminal B to the register circuits including wires 31 and 32.

When relay ODT picks up, its contacts b and d remove the shunts from the transmitting contacts of relay O1T; its contacts e and g connect terminal B to wires 55 and 56, and the closing of its contact f energizes the repeating relay DTP. Contact e of relay DTP connects terminal B to wire 57; its front contact c connects terminal B at front contact c of relay ODT to wire 37 to provide a stick circuit for relay 1PC which is independent of relays OLB and OLBS; its contact f connects terminal B to wire 16D to provide stick circuits for the energized register relays of Fig. 3D, which are independent of relay LBP, and its contact d connects terminal B to wire 34 to hold relay ST—CK energized while the stepping switches of Fig. 3E are in off-normal positions.

It will be noted that in Fig. 3D, the register relay IP in the group controlled by the "month" buttons, and relays 4P–7P in the group controlled by the date dial, are the only register relays energized by the code illustrated in Fig. 12. In this case, the selecting circuits prepared by their contacts extend from wire 55 to wire 60 and also to wire AG; from wire 56 to wire 16U; and from wire 57 to wire IS, as may be seen from the drawing without tracing the circuits in detail. It follows that when relay ODT picks up, the month selector relay 3M is energized over wires 55 and 60; the group selector relays AIG and A2G are energized over wires 55 and AG, and terminal B is connected over wires 56 and 16U to contact points P16 in bank U to all of the stepping switches ST.

When relay DTP picks up, the train selector relay IAS is energized over wires 57 and IS, and contact a of relay AIG, and the closing of contacts a and b of relay IAS connects terminal B to the magnets SM of the stepping switches ISTI and 2STI which operate their contact arms to the position where their magnets are held steadily energized over the contact points P16 of the banks IUI and 2UI. Wire 32U is connected directly to wire 56 and prevents any of the stepping switches from advancing beyond point P32 in the event of a fault.

The points P16 and contact arms of the switch banks IXI, IYI, and IZI connect three plug switches in the panel for switch ISTI in section ISU of the reservation board to the wires IX, IY, and IZ, and those of the switch banks 2XI, 2YI, and 2ZI connect three other plug switches in the panel for switch 2STI in section 2SU to wires 2X, 2Y, and 2Z, respectively. Contacts a and b of relay 3M are now closed and extend the connection of the bus wires IZ and 2Z to the corresponding transmitter control wires IC and 2C, which when connected to terminal B at a closed plug switch PL provide a holding circuit for relay OIT or O2T to generate a corresponding long step in a reply code.

It will be seen that the energization of a selector relay such as relay IAS establishes a connection to one plug switch only in each panel of the reservation board having its stepping magnet connected to a contact of the selector relay.

The stepping switches operate at a relatively high speed, usually about 50 steps per second, and are capable of assuming any selected position in a time less than that allotted to the 16th code step. The contacts of relays PR and R assume their right-hand positions at the beginning of this step, relays 2L, LP, LB, LBS, and IL are released in cascade by relay R; relays M, CR, and 16 are released by relay LB; and contacts b and d of relay 16 then shunt the transmitting contacts of relay IT. Relays O2L, OLP, OLB, OLBS, and OIL are released in cascade by relay PR, and relays D, CR, O16, and LBP are released by relay OLB. Relay LBP is timed so that its release follows that of relay OIL, and when back contact a of relay LBP closes, relay OM picks up over back contacts b of relays OIL, O2L and OMT, and front contact b of relay DTP and completes the transmitting circuits so that relay OIT picks up, and since relays ODT and MT are now picked up and relay 16 is released, this closes the line circuit to begin the first step of the reply code, energizing relays PR and R. Relay PR energizes relays OI, OIL, O2L, OLP, OLB, OLBS, and OLPB, and relay R energizes relays I, IL, 2L, LP, LB, and LBS as on the first step of the request code already described.

The stick circuits for relays ODT and ISS are open at front contacts a and b of relay LBP during the relatively short interval that relay LBP is released at the end of the request code, but the release period of these relays is such that they do not release at this time, except in the case of a fault. In Figs. 4A and 4C, relay MT holds relays CB and CC picked up, and relay CC holds relay MT picked up. In the case of a fault these relays are released by the thermal relay THR.

In Fig. 3B, the reception lamp RE is extinguished when relay D releases, and the transmission lamp TE is lighted when relay OM picks up.

The circuits for controlling relay OIT are similar to those for controlling relay IT as above described and the transmission of the reply code is similar to that of the request code and the description of the latter already given is in large part applicable to the reply code. It will suffice to note that the holding circuits for generating the long steps of the reply code are those which include wires 47 and 50 and extend over contacts c and d of the counting relays of Fig. 3C to the wires IC–I5C and thence in Fig. 3E to the plug switches PL. Each step of a reply code is a short step when the corresponding space is unavailable, as indicated either by the insertion of a plug in the corresponding switch, or by the non-operation of any stepping switch for the corresponding type of space.

In the reply code being described, steps 1 and 2 are the only long steps, as indicated in Fig. 12, due to the fact that energy is supplied over circuits including wires IC and 2C, which are similar to the circuits including wires IA and 2A already described. Relay IL releases on the first step and picks up the indication relay IK, Fig. 4C, over the circuit extending from terminal N through its winding, contact c of relay CC, wire IB, front contact e of relay I, back contact e of relay CR, wire 31, contact d of relay IL, contacts f of relays LB and MT to terminal B at back contact c of relay DT. Relay 2L releases on the long second step of the reply code to pick up a relay 2K, not shown, over a similar circuit including wire 2B.

Each indication relay such as IK which is picked up is held energized over a stick circuit including an indication lamp such as IKE, located as shown in Fig. 2, which when lighted indicates that the corresponding type of space is available on the train and date indicated by the lighting of lamp UE and one of the lamps AE–HE in the control portion of the console.

When the counting relays 16 and O16 pick up on the final step of a reply code, the reception totalizing relay DT picks up over front contacts e of relay MT, 16, and LB and back contact b of relay M, and the transmission totalizing relay OMT, Fig. 3B, picks up over contact e of relay O16 and contact c of relay OM. Relay MT is released by relay DT, and the buzzer BZ, Fig. 4C, is energized over contact r of relay CC, wire 16B and front contact c of relay DT. Relay MT, on releasing, disconnects terminal B from wires 19 and 20, which releases relays CB and CC, and terminates the operation of the buzzer BZ. When relay OMT picks up, it opens its back contact g in the pickup circuit for relay OIT to prevent its further operation; opens its back contact e to disconnect terminal B from wires 55 and 57, thereby releasing relays AM, AIG, A2G, and IAS; opens its back contact c, which disconnects terminal B from wire 37 and releases relay IPC; opens its back contact a, which releases relay ODT; and closes its contact d to maintain the check relay ST—CK picked up.

The release of relay IPC disconnects the office coding unit from the line circuit over which the reply code was transmitted, this being now open at the back contact d of relay ISS.

The release of relay ODT disconnects terminal B from wire 56, and consequently, from wires 16U and 32U in Fig. 3E, releasing the stepping magnets SM, each of which is then repeatedly reenergized over contact a of the associated off normal switch ONS until the contact arms reach the normal position P40 where contact a of switch ONS opens and its contact b closes. The last stepping switch to reach normal closes the stick circuit including wire 16C, for the check relay ST—CK. Relay ODT releases relay DTP, which in turn releases relay OM, which extinguishes lamp TE.

When the contacts of relays PR and R assume their right-hand positions at the beginning of the 16th step of the reply code, relays O2L and 2L are deenergized consequently relays O2L, OLP, OLB, OLS, and OIL release in cascade; likewise relays 2L, LP, LB, LBS, and IL; and relay LB releases relays 16 and CR.

When relay CC releases, as above described, lamp SE becomes dark, and terminal B is reconnected to the latch bar contact 65, which may now be operated to store a new request code for transmission by picking up relay CA, the operation of which is indicated by lamp SE becoming steadily lighted. When relay IL releases, relays M and IT pick up, connecting the line wires L1 and L2 together, but the transmission progresses no further until the office equipment is conditioned to receive a code. If this does not occur within a reasonable time, relays CA, M, and IT are released by the operation of the thermal relay THR.

At the office, relays O16, OCR, and LBP are released by relay OLB, relay LBP being so timed that its release follows that of relay OIL. Relay LBP, on releasing, releases relay OMT; disconnects terminal B from wire 16D, which releases the energized register relays of Fig. 3D; and disconnects terminal B from wire 38, deenergizing the slow release relay ISS.

Relay OMT releases before the end of the delay period measured by relay ISS and connects terminal B at back contact a of relay LBP to wire 35 and in the event codes are stored for transmission on other line circuits, this completes a pickup circuit for the next relay of the series of PC relays which has its line relay NR energized, thereby initiating the transmission of a second code and the reestablishment of the stick circuit for relay ISS. In the event no codes are stored on any other line circuit, relay IPC may be picked up to initiate the transmission of a second request code from the same line circuit, following the release of relay ISS at the end of its delay period.

When relay OMT releases it disconnects terminal B from wire 34, which releases relay ST—CK in the event its stick circuit is open due to the failure of a stepping switch to return to normal. If relay ST—CK releases, it operates the buzzer OBZ and disconnects terminal N of the source from relays PC, OM, and D. Relay ST—CK may be picked up by closing the key ST—B to cut out the checking circuit if desired.

The sale of space, ascertained to be available by operation of the reservation system as above described, is usually accomplished with the aid of a telephone circuit which generally is superimposed upon the code line circuit. To facilitate this the coding equipment is arranged to operate telephone call signals comprising a lamp CE for each line circuit and a bell 66, shown in Fig. 3A.

To operate the call system, the operator presses the button CLP, Fig. 2, the circuits for which are shown in Fig. 4A. When the apparatus is in its normal at rest condition, this picks up the stick relay CLR, over the circuit extending to terminal B at back contact e of relay LBS. Relay CLR is held energized over its contact a; lamp CLE is lighted, and relay IT picks up over back contact b of relay 2T, back contact d of relay M and front contact b of relay CLR, closing its transmitting contacts b and d.

At the office, relay INR operates and picks up relay IPC, which reverses the line polarity, releases relay INR and energizes relay ISS, and then the line relays R and PR pick up, energizing the relays 1, IL, 2L, LP, LB, and LBS, and relays D, O1, OIL, O2L, OLP, OLB, OLBS, and LBP, respectively, as on the first step of the codes already described. When relay LBS picks up it releases relays CLR and IT, which then remain released. Relays R and PR release, energizing relays 2 and O2, and releasing relays 1, 2L, LP, LB, etc., and relays O1, O2L, OLP, OLB, D, IPC, OLBS, O2, OIL, LBP, and ISS, in the order listed, to restore the system to its normal condition.

When relay OLB releases, a circuit is completed momentarily for relay ICK, Fig. 3A, over contact g of relay IPC, wire 54, back contact e of relay OLB, wire 53, front contact e of relay O2, back contact f of relay OCR, wire 52, contact d of relay O2L, and contacts c of relays D and LBP to terminal B; relay ICK picks up to complete its stick circuit including the lamp ICE, and bell 66 is caused to sound. Lamp ICE is extinguished and relay ICK released by operation of button ICP when the call is acknowledged.

As shown in Fig. 3A, a lamp CE and push button CP are provided for each of the line circuits radiating from the office.

Although I have herein disclosed but one form of remote control system, together with several modifications of portions thereof embodying my invention, it will be understood that various changes and modifications may be made therein within the scope of the appended claims without departing from the spirit and scope of my invention.

Having thus described my invention, what I claim is:

1. In an automatic reservation system, the combination of a posting board at a central office divided into sections each containing a plurality of switches arranged in rows and columns for manually posting different items of information, a code type communication system connecting said office with a plurality of remote stations having a coding unit at the office and one at each station for the transmission and reception of request codes and reply codes between the office and such station, each comprising a series of elements of controllable character, a plurality of indicators at each station including one for each section of said posting board, a manually operable starting relay at each station, means responsive to the operation of each starting relay for seizing the office coding unit when available and for initiating the transmission of a request code thereto by the associated station coding unit which includes elements for selecting designated switches in a plurality of sections of said posting board, manually operable control apparatus at each station having a plurality of operative positions in which contacts are closed or opened thereby in a code combination distinctive for each position, said apparatus controlling the character of the elements of a request code transmitted by the associated coding unit to designate for selection one switch in a particular row and column in each of a plurality of the sections of said posting board, selecting means controllable by said office coding unit upon reception of said request code to select said designated switches, means for causing said office coding unit to continue in operation and to transmit a reply code to the station coding unit which initiated such request code, in which the characters of the elements are controlled in accordance with the closed or open condition of the switches selected by said request code, and register means controllable by such station coding unit upon reception of said reply code for controlling the indicators at such station for a plurality of the sections of said posting board in accordance with the condition of the selected switches in the corresponding sections of said posting board.

2. An automatic reservation system of the type recited in claim 1, in which the rows and columns of switches on said posting board are identified by labels and the manually operable control apparatus at each station includes at least two circuit controllers manually operable to different positions independently of one another for governing the character of the elements in each request code transmitted from such station, each such circuit controller having a plurality of operative positions in which contacts are closed or opened thereby in a code combination distinctive for each position and a label is displayed to identify such position, the labels on one circuit controller designating different rows and those on the other designating different columns of the switches on said posting board, the code elements transmitted in accordance with the position of one controller causing the selection by the office coding unit of a particular row of switches having the same label as that displayed by said one controller in each of a plurality of sections of said posting board, and the code elements transmitted in accordance with the position of the other controller causing the selection by the office coding unit of a particular switch in each of the selected rows, which is in the column having the same label as that displayed by the other circuit controller.

3. An automatic reservation system of the type recited in claim 1 in which the apparatus at each station includes a transmission connector relay controlled by the starting relay and a reception connector relay controlled by the transmission connector relay, the transmission connector relay being operated upon the initiation of a request code and serving to connect the station coding unit to contacts the positions of which reflect the condition of the manually operable control apparatus at such station, and means for operating the reception connector relay and for releasing the starting relay and the transmission connector relay when such request code is completed, said reception connector relay serving to connect the station coding unit to said indicators during the reception of a reply code to effect their control in accordance with the character of the elements of the reply code received by the station coding unit.

4. An automatic reservation system of the type recited in claim 1, in which the apparatus at each station includes a lockout stick relay and a series of indication stick relays including one for each indicator at the station, each indication stick relay having a pickup circuit adapted to be closed or left open upon the reception of a particular element of a reply code, and a stick circuit opened upon the operation of said lockout relay to its energized position, said lockout relay having a pickup circuit closed in response to a change in position of any of the manually operable circuit controllers which govern the character of the elements of a request code, and a stick circuit which is opened to release the lockout relay at the beginning of a request code by the operation of the starting relay at such station.

5. In an automatic reservation system having a posting board at a central office containing switches for manually posting different items of information, coding units at the office and at a remote station for transmitting and receiving codes of elements of controllable character, said station coding unit being adapted to transmit request codes to effect the selection by the office coding unit of different groups of switches on said posting board, said office coding unit being adapted to transmit reply codes to effect the control by the station coding unit of a series of indicators to indicate the closed or open condition of the selected switches, manually operable control apparatus connected to control terminals of said station coding unit for governing the character of the elements of each request code, comprising, in combination, a rotatable circuit controller having a plurality of operative positions, cam controlled contacts actuated by said controller which supply energy or not to a first group of said control terminals in different code combinations each of which identifies a different operative position of said circuit controller, a series of push buttons each effective when operated to supply energy or not to a second group of said control terminals in different code combinations each of which identifies the operated button, a latch for maintaining each operated button in its operated position until released, and means including a manually operable contact which closes momentarily in response to the operation of any of said buttons for initiating the transmission of a request code by said station coding unit.

6. In an automatic reservation system of the type recited in claim 5, in which the manually operable control apparatus for governing the selection of the switches on said posting board includes means for displaying a visual indication identifying the switches selected by a request code concurrently with the display of indications of their positions supplied by the corresponding reply code, comprising, in combination, a coordinate chart mounted on a drum on said rotatable circuit controller having spaces arranged in rows and columns thereon upon which identifications of each different group of concurrently selectable switches may be marked, said chart including a row of spaces for each push button and a column of spaces for each operative position of said controller, a plurality of lamps including one controlled by each push button when operated for illuminating the space on said chart in the row which identifies said button and in the column which identifies the position to which said controller has been operated, and lockout means effective upon initiation of a request code by operation of one of said buttons to complete the circuit for the lamp associated therewith, said lockout means maintaining such circuit closed only as long as such button remains in its operated position and there is no change in the position of said rotatable circuit controller.

7. In an automatic reservation system having manually operable control apparatus which includes means for displaying a visual indication of the type recited in claim 6, in which a lockout relay is provided to insure correlation between the indications supplied by a reply code and the indication displayed by the illumination of a space on said chart, said lockout relay having a pickup circuit which closes momentarily each time said controller is moved from one operative position to another, and a stick circuit which closes when said relay becomes energized and is opened upon the initiation of a request code by the operation of one of the associated push buttons, said lockout relay having a back contact in the circuit for the lamps for illuminating the spaces on said chart.

8. An automatic reservation system having a posting board at a central office containing switches arranged in rows and columns identified by labels for manually posting items of information of different classes, a plurality of indicators at a remote station having labels designating said classes, a remote control system having coding units at the office and at said station for transmitting and receiving codes of elements of controllable character, said station coding unit being adapted to transmit request codes to effect the concurrent selection by the office coding unit of a plurality of said switches, said office coding unit being adapted to transmit a reply code in response to each request code to effect the concurrent control by the station coding unit of said indicators to display indications of the closed or open condition of the selected switches, manually operable control apparatus comprising two circuit controllers each rotatable to different positions in which labels are displayed designating different rows and columns respectively of switches on said posting board, contacts closed or opened by each controller in its different operative positions in a code combination distinctive for each position for governing the character of the elements of a request code, the elements governed by one controller being effective to select designated rows of switches and those governed by the other, one switch in a designated column in each selected row, a manually operable starting button for initiating the transmission of a request code, and lockout means responsive to the operation of said button for conditioning said indicators to display indications in response to a supply code to indicate the closed or open condition of the switches designated by the labels displayed by said controllers only as long as said controllers remain unchanged following the operation of said button.

9. In an automatic reservation system of the type recited in claim 8, in which the operation of the starting button for initiating the transmission of a request code is effective to illuminate the label designating the operated position of at least one of said controllers and said lockout means is effective to continue the illumination of said label only as long as said controllers remain in the same position following the operation of said controller.

10. In an automatic reservation system of the type recited in claim 8, in which the operation of the starting button when said rotatable circuit controllers are in a particular check position is effective to initiate the transmission of a check code by the station coding unit, said check code being effective to initiate the transmission of a reply check code by the office coding unit without establishing connections to any of the switches on said posting board, said reply code being effective to cause the display of indications by all of the indicators at the station by which their operability may be verified.

ARTHUR P. JACKEL.

REFERENCES CITED

The following references are of record in the file of this patent:

UNITED STATES PATENTS

| Number | Name | Date |
|---|---|---|
| 1,786,524 | Durbin | Dec. 30, 1930 |
| 1,787,620 | Faverger | Jan. 6, 1931 |
| 2,088,942 | Boswau et al. | Aug. 3, 1937 |
| 2,202,392 | May et al. | May 28, 1940 |
| 2,411,375 | Jackel | Nov. 19, 1946 |
| 2,446,037 | Ammann et al. | July 27, 1948 |
| 2,542,890 | Basu et al. | Feb. 20, 1951 |
| 2,594,865 | Bumstead | Apr. 29, 1952 |
| 2,594,960 | May | Apr. 29, 1952 |

FOREIGN PATENTS

| Number | Country | Date |
|---|---|---|
| 441,642 | Great Britain | Jan. 23, 1936 |

OTHER REFERENCES

Electrical Communication, September 1948, pages 220–231.